(12) United States Patent
Mohammadian et al.

(10) Patent No.: US 12,366,493 B2
(45) Date of Patent: Jul. 22, 2025

(54) DETERMINING RESIDUAL TENSION IN THREADED FASTENERS

(71) Applicant: PREDICTANT, LLC, Raleigh, NC (US)

(72) Inventors: Armita Mohammadian, Raleigh, NC (US); Gaofeng Sha, Copley, OH (US); Joshua Scott, Raleigh, NC (US); Ethan Loewenthal, Durham, NC (US); Klarissa Ramos, Raleigh, NC (US); Ashtad Javanmardi, Raleigh, NC (US); Akash Nikam, Knightdale, NC (US); Ziad Siddique, Cary, NC (US); J. Darrin Holt, Raleigh, NC (US)

(73) Assignee: Predictant LLC, Raleigh, NC (US)

( * ) Notice: Subject to any disclaimer, the term of this patent is extended or adjusted under 35 U.S.C. 154(b) by 172 days.

(21) Appl. No.: 17/927,565

(22) PCT Filed: May 27, 2021

(86) PCT No.: PCT/US2021/034614
§ 371 (c)(1),
(2) Date: Nov. 23, 2022

(87) PCT Pub. No.: WO2021/243077
PCT Pub. Date: Dec. 2, 2021

(65) Prior Publication Data
US 2023/0213401 A1  Jul. 6, 2023

Related U.S. Application Data

(60) Provisional application No. 63/031,524, filed on May 28, 2020.

(51) Int. Cl.
*G01L 5/24* (2006.01)
*E21D 21/02* (2006.01)

(52) U.S. Cl.
CPC ............... *G01L 5/24* (2013.01); *E21D 21/02* (2013.01)

(58) Field of Classification Search
CPC .................................. E21D 21/02; G01L 5/24
(Continued)

(56) References Cited

U.S. PATENT DOCUMENTS

| 4,014,208 A | 3/1977 | Moore et al. |
| 4,333,351 A | 6/1982 | Bickford |

(Continued)

FOREIGN PATENT DOCUMENTS

| BR | 122022020567 B1 * | 9/2023 | ............. E21D 21/00 |
| CN | 110501108 A | 11/2019 | |

(Continued)

OTHER PUBLICATIONS

PCT, Extended European Search Report regarding PCT Application No. PCT/US2021034614, dated May 10, 2024, 8 pages.
(Continued)

*Primary Examiner* — Eric S. McCall
(74) *Attorney, Agent, or Firm* — McAndrews Held & Malloy, Ltd.

(57) ABSTRACT

The present disclosure provides systems and methods for determining residual tension of a target bolt. An example method may include modeling ratios of times-of-flight of longitudinal waves and times-of-flight of shear waves as a function of tension for a plurality of test bolts. The modeling may include receiving data from longitudinal wave and shear wave transducers, analyzing the data to assess certain quality characteristics, and using a machine learning algorithm to create the model. The example method may further include determining a ratio of a time-of-flight of longitudinal waves and a time-of-flight of shear waves in a target bolt. The example method may further include determining
(Continued)

residual tension in the target bolt based on the model and the ratio of a time-of-flight of longitudinal waves and time-of-flight of shear waves in the target bolt.

19 Claims, 24 Drawing Sheets

(58) Field of Classification Search
USPC .......................................................... 73/761
See application file for complete search history.

(56) References Cited

U.S. PATENT DOCUMENTS

| | | |
|---|---|---|
| 6,327,912 B2 | 12/2001 | Basile et al. |
| 6,769,957 B2 | 8/2004 | Buttram |
| 8,511,165 B2 | 8/2013 | Lopez Jauregui |
| 2011/0296922 A1 | 12/2011 | Ali |
| 2012/0222485 A1 | 9/2012 | Stickel |
| 2012/0224456 A1 | 9/2012 | Visser et al. |
| 2013/0000245 A1 | 1/2013 | Tarr |
| 2015/0039764 A1 | 2/2015 | Beloglazov et al. |
| 2019/0052240 A1 | 2/2019 | An et al. |
| 2019/0203599 A1 | 7/2019 | Sun et al. |
| 2019/0311301 A1 | 10/2019 | Pyati |
| 2023/0141264 A1* | 5/2023 | Sands ................ G01N 29/4427 73/587 |

FOREIGN PATENT DOCUMENTS

| | | | |
|---|---|---|---|
| CN | 111191742 A | 5/2020 | |
| EP | 1447661 A1 | 8/2004 | |
| KR | 100819147 B1 | 4/2008 | |
| KR | 102323547 B1 | 11/2021 | |
| WO | WO-2017063098 A1 * | 4/2017 | |
| WO | 2017143456 A1 | 8/2017 | |
| WO | WO-2018032106 A1 * | 2/2018 | ............ E21D 21/00 |
| WO | 2021037964 A1 | 3/2021 | |

OTHER PUBLICATIONS

PCT, International Search Report regarding PCT Application No. PCT/US23/63628, dated Oct. 24, 2023, 5 pages.

PCT, Written Opinion regarding PCT Application No. PCT/US23/63628, dated Oct. 24, 2023, 11 pages.

International Search Report and Written Opinion for PCT Patent Application No. PCT/US2021/034614 dated Aug. 15, 2021, 9 pages.

Albert C. Holt et al., "An Ultrasonic Technique For Axial Bolt-Stress Determination", JAG Industries and Univ. of CA., pp. 1549-1557.

Kim Nohyu et al. "Measuement of Axial Stress Using Mode-Converted Ultrasound", NDT & E International, vol. 42, Issue 3, Apr. 2009, pp. 164-169.

Qinxue Pan et al., "Research Review of Principles and Methods for Ultrasonic Measurement of Axial Stress in Bolts", Chinese Journal of Mechanical Engineering (2020) 33:11, pp. 1-16, https://doi.org/10.1186/s10033-020-0431-x.

Xiao Li et al., "The Nondestructive Evaluation of Axial Stress of a Bolt in Situ By Combination of Shear and Longitudinal Wave", School of Mechanical Engineering, Beijing Institute of Technology, No. 5 and Department of Mechanical Engineering, Northwestern Univ., The 12th International Conference of the Slovenian Society for Non-Destructive Testing, Sep. 4-6, 2013, Portoro, Slovenia, pp. 161-170.

Malik Shubham et al., "XGBoost: A Deep Drive into Boosting (Introduction Documentation)", Technical Report, Feb. 2020, Research Gate, pp. 1-22.

* cited by examiner

DETERMINING RESIDUAL TENSION IN THREADED FASTENERS

CROSS REFERENCE

The present application is a U.S. national stage application under § 371 of International Patent Application No. PCT/US2021/034614, filed May 27, 2021, which claims the benefit under 35 U.S.C. § 119 (e) of U.S. Provisional Patent Application Ser. No. 63/031,524 filed May 28, 2020 and titled "Systems and Methods for Estimating Residual Torque and Tension" The disclosures of the above-identified applications are incorporated herein by reference in their entireties and made a part of this specification.

FIELD

The present disclosure generally relates to systems and methods for determining residual tension in threaded fasteners, such as bolts. More particularly, the disclosure is directed to systems and methods for determining residual tension in threaded fasteners using instrumentation and regression analysis.

BACKGROUND

Bolted connections in which threaded fasteners join structural members together are among the most common types of joining methods. As used herein, threaded fasteners can include bolts, studs, and any other threaded fastener that clamps two or more structural members together. A clamping force ("preload") may be imparted by threading the fastener into a nut or into threads tapped into one of the structural members. For convenience and simplicity, the term "bolt" will be used throughout this disclosure to refer to a threaded fastener, but it should be understood that this disclosure and the inventive systems and methods herein are not limited to what is commonly referred to as a bolt and may be applied to other threaded fasteners used to join structural members.

When a clamping force is applied to a bolted joint (e.g., by tightening a nut on the bolt), the bolt will develop both stress and strain as a result of the force. Axial stress (and specifically, tensile stress) is the amount of tensile force (i.e., tension) per cross-sectional area of the bolt. This is an example of normal stress because the direction of the force is normal to the area of the bolt resisting the force. Shear stress, on the other hand, is transverse to the longitudinal axis of the bolt because the direction of the force is parallel to the area of the bolt resisting the force.

For bolted connections that support large structures, engineers typically specify an amount of torque needed to achieve a desired level of tension. This level of tension is the amount of tension that should be set in each bolt when the bolted connection is made as well as the amount of tension that should be maintained over time. The amount of tension that remains in a bolt after a bolted connection is made is commonly referred to as residual tension.

It is common for the residual tension in a bolt to decrease over time. This can be due to many reasons, including, for example, vibrations, shifting of the fastened members, joint relaxation, bolt fatigue, corrosion, temperature changes, and the like. When the residual tension of a bolt falls below an acceptable level, the bolt and the structure will not perform as designed. Under-tensioned bolts can compromise the structural integrity and stability of the structure, which can result in damage to the structure, or worse, catastrophic collapse.

It is therefore critical to periodically audit bolted joints to ensure that the residual tension in the bolts remains sufficient to meet design specifications. Unfortunately, all known methods for performing such audits are inefficient and imprecise. For example, there is currently no known instrumented method to measure tension in a set of bolts (e.g., measure clamping force in a bolted connection/joint), then to apply those measurements to determine the residual tension in other bolts. Instead, each bolt is audited independently, making the auditing process time-consuming.

Heavy equipment such as a hydraulic jack, a hydraulic pump, and/or a torque wrench are also typically used to perform the audits. The most common method to perform such audits is to use a calibrated torque wrench to apply an amount of torque to each bolt under audit to achieve the specified design tension. This method, however, is fairly imprecise because the amount of torque indicated on the torque wrench is only an indirect indication of tension—it is not a direct measurement of tension. Thus, by applying a specified amount of torque, the desired amount of tension may not be reached. The use of heavy equipment is also time- and labor-intensive, and potentially dangerous to the operators and to the structure.

There are other inefficiencies inherent in known methods. For example, because all known methods are time-consuming, periodic audits are typically performed on only a subset of bolts disposed on a structure. Large structures can employ dozens, hundreds, or even thousands of bolts in bolted joints. For that reason, periodic audits are typically performed on a small subset of the bolts (e.g., 10%). Thus, another major drawback with current methods is that periodic audits address only some bolts on a structure while leaving the remaining bolts unaudited for considerable lengths of time.

Another inefficiency is wasted time. With current methods, each bolt audited is typically torqued until it meets design specifications without first measuring the amount of tension in the bolt. This is inefficient, however, because it is possible that no maintenance needed to be performed on some of the bolts. Moreover, because torque is not a direct measurement of tension, this can also result in some bolts being deemed acceptable when, in fact, they are not set to the correct level of tension.

Other methods of auditing residual tension in bolts require baseline measurements and/or require manipulating the bolts (e.g., conducting destructive tests). For example, some methods require making a baseline measurement on a bolt either at the time of installation or by loosening a bolt in situ to zero tension to make the measurements, then comparing the baseline measurements to subsequent measurements. This method is inefficient at least because it must be done on every bolt. That is, baseline measurements for one bolt have no bearing on measurements for other bolts. Each bolt is audited independently.

In sum, all current methods for determining or estimating the amount of residual tension in bolts are imprecise, time-, labor-, and cost-intensive, potentially dangerous to personnel and to the structure, typically apply to only a small subset of all bolts disposed on a structure, and provide only indirect indications of the actual level of tension in any bolt. An efficient and precise way to determine the residual tension of bolts is therefore needed.

SUMMARY

The present disclosure provides systems and methods for determining the residual tension of bolts. The inventive systems and methods disclosed herein are the first known in the industry to provide measurements of residual tension through instrumentation and without the need for baseline measurements on bolts or by manipulating the bolts. As explained more fully below, the residual tension in a bolt can be determined based on a model that expresses tension and/or tensile stress as a function of wave propagation. In this way, residual tension in a bolt can be determined by applying the model and without directly measuring tension. The inventive systems and methods therefore eliminate or minimize the inefficiencies and safety hazards of all known methods used to measure residual tension.

The systems and methods disclosed herein have far-reaching applications and can be applied to determine the residual tension of bolts used in nearly any industry. For example and without limitation, these systems and methods can be applied to industries such as renewable energy, power generation and delivery, oil and petroleum refineries, telecommunications, bridges, dams, aeronautics, automotive, buildings, and many more.

One non-limiting example application is towers for wind turbines, such as tower 102 illustrated in FIG. 1. As shown, tower 102 is segmented and includes segments 102a, 102b, and 102c. As illustrated in the enlarged view, segments 102b and 102c are joined with flanges 104b and 104c, which are fastened together with a plurality of bolts 106. The plurality of bolts 106 are examples of bolts to which the inventive systems and methods may be applied to determine residual tension. The efficiency of these systems and methods can allow an entire wind farm to be audited in a fraction of the time and for a fraction of the cost of current methods, and most importantly, will provide the most precise measurements of residual tension known in the industry.

The invention is premised on relationships between the times-of-flight (ToF) of shear waves and longitudinal waves in a bolt and tensile stress in the bolt, where the time-of-flight is the time that it takes a wave to travel from one end of the bolt and reflect back. The ToF of shear waves and the ToF of longitudinal waves are each a function of tensile stress and length of the bolt:

$$\text{ToF}_{shear} = F_1(\text{Stress}, \text{Length}) \quad (1)$$

$$\text{ToF}_{longitudinal} = F_2(\text{Stress}, \text{Length}) \quad (2)$$

The ToF of shear waves and the ToF of longitudinal waves are also functions of other parameters, such as temperature and material properties. These parameters, however, can be considered constant for purposes of the invention. Thus, equations (1) and (2) have two unknown parameters, which can be solved to eliminate one of the unknown parameters. In this case, length can be eliminated and stress can be measured. Through experimentation, the inventors have thus developed the empirical equation:

$$\text{ToF}_{ratio} = C - D\sigma \quad (3)$$

where $\text{ToF}_{ratio}$ is the ratio of a time-of-flight of shear waves ($\text{ToF}_{shear}$) and a time-of-flight of longitudinal waves ($\text{ToF}_{longitudinal}$), $\sigma$ is the tensile stress of a bolt, and C and D are constants. Because tensile stress is a measure of tension per unit of cross-sectional area, $\sigma$ can be determined empirically by applying known values of tension to one or more test bolts, then dividing by the nominal cross-sectional area of the bolt. By applying these known values of tension and measuring $\text{ToF}_{ratio}$, the values of C and D can be determined with respect to tensile stress.

Equation (3) can be transformed by solving for $\sigma$, which results in the equation $$\sigma_R = \frac{C - \text{ToF}_{ratio}}{D} \quad (4)$$

where $\sigma_R$ is the tensile stress associated with the residual tension of a bolt, $\text{ToF}_{ratio}$ is the ratio of $\text{ToF}_{shear}$ and $\text{ToF}_{longitudinal}$ in the bolt, and C and D are constants. Once C and D are determined (e.g., by using equation (3) and applying known levels of tension, then dividing by the cross-sectional area of the bolt to calculate tensile stress), equation (4) can be applied to determine the tensile stress ($\sigma_R$) of other bolts by measuring only the $\text{ToF}_{ratio}$ for each bolt. The residual tension of the bolts can then be determined by multiplying the tensile stress ($\sigma_R$) by the nominal cross-sectional area of the bolts.

In this way, a set of bolts can be used to create a model that expresses tensile stress as a function of times-of-flight. This model can be created by applying known tension values to the set of bolts and measuring the times-of-flight, then building the model with regression analysis. After a model is created, it can be used to determine the residual tension in other bolts (i.e., bolts not directly measured while creating the model) merely by measuring times-of-flight.

Notably, because length has been removed from the system of equations and other parameters are considered constant (e.g., temperature and material properties), the residual tension in a bolt can be determined regardless of whether the model is based on bolts of the same or different size as the bolt for which residual tension is to be determined. As just one non-limiting example, five Grade 10.9 M36 bolts having lengths of 205 mm and five Grade 10.9 M42 bolts having lengths of 387 mm can be used to create a model for tensile stress, and that model can be used to accurately determine the residual tension of a Grade 10.9 M64 bolt having a length of 417 mm.

Because tensile stress is a measure of tension per cross-sectional area, equation (3) can be converted to $$\text{ToF}_{ratio} = A - BT \quad (5)$$

where $\text{ToF}_{ratio}$ is the ratio of $\text{ToF}_{shear}$ and $\text{ToF}_{longitudinal}$ in a bolt, T is the tension of a bolt, and A and B are constants. As explained above with respect to equation (3), by applying known values of tension and measuring $\text{ToF}_{ratio}$, the values of A and B can be determined.

Equation (5) can be transformed by solving for T, which results in the equation $$T_R = \frac{A - \text{ToF}_{ratio}}{B} \quad (6)$$

where $T_R$ is the residual tension of a bolt, $\text{ToF}_{ratio}$ is the ratio of $\text{ToF}_{shear}$ and $\text{ToF}_{longitudinal}$ in a bolt, and A and B are constants. Once A and B are determined (e.g., by using equation (5) and applying known levels of tension), equation (6) can be applied to determine residual tension of other bolts by measuring only the $\text{ToF}_{ratio}$ for each bolt.

The systems and methods disclosed herein therefore provide numerous advantages over current methods. One can readily determine the residual tension of every bolt on a structure (e.g., wind turbine tower (and every tower on a wind farm)) merely by measuring $\text{ToF}_{shear}$ and $\text{ToF}_{longitudinal}$ in each bolt and calculating the ratio. Moreover, once a model is developed, the equipment needed to conduct these tests, as explained in detail below, include transducers, pulser/receivers, and/or processing devices (e.g., computer, tablet, etc.). This stands in sharp contrast to known methods, which require the use of heavy machinery, are typically applied to only a few bolts on a structure, and provide little insight about the residual tension of any of the bolts. Thus, the inventive systems and methods are more precise, safer, faster, and less-costly to perform than all known methods, and can provide comprehensive insight into the residual tension of bolts that is unavailable with known methods.

While various embodiments are described below with reference to example combinations of features and/or concepts, it should be understood that the features and concepts described herein may be combinable in other ways not specifically described. For example, the various embodiments are described in the paragraphs below in terms of various aspects. A feature or concept appearing in reference to one of these aspects may be combined with features and concepts described in reference to any other aspect.

In a first aspect, a method of determining residual tension in a target bolt is provided. The method includes modeling ratios of times-of-flight of longitudinal waves and times-of-flight of shear waves as a function of tension for a plurality of test bolts. The method further includes determining a ratio of a time-of-flight of longitudinal waves and a time-of-flight of shear waves in a target bolt. The method further includes determining residual tension in the target bolt based on the model and the ratio of a time-of-flight of longitudinal waves and time-of-flight of shear waves in the target bolt.

In embodiments of the first aspect, modeling ratios of times-of-flight of longitudinal waves and times-of-flight of shear waves as a function of tension for a plurality of test bolts comprises using a machine learning algorithm that receives, as inputs, at least the times-of-flight of longitudinal waves and the times-of-flight of shear waves for the plurality of test bolts; and tension levels corresponding to each of the times-of-flight of longitudinal waves and times-of-flight of shear waves.

In embodiments of the first aspect, the machine learning algorithm further receives, as input, the ratios of times-of-flight of longitudinal waves and times-of-flight of shear waves in the plurality of test bolts. In embodiments of the first aspect, the machine learning algorithm further receives, as input, the size of each of the plurality of test bolts. In embodiments of the first aspect, the machine learning algorithm further receives, as input, the length of each of the plurality of test bolts. In embodiments of the first aspect, the machine learning algorithm further receives, as input, the clamp length of each of the plurality of test bolts. In embodiments of the first aspect, the machine learning algorithm comprises creating an XGBoost regression model.

In embodiments of the first aspect, modeling ratios of times-of-flight of longitudinal waves and times-of-flight of shear waves as a function of tension for a plurality of test bolts comprises determining, for each test bolt in the plurality of test bolts: one or more times-of-flight of ultrasonic (UT) longitudinal waves in the test bolt corresponding to one or more levels of tension; one or more times-of-flight of UT shear waves in the test bolt corresponding to the one or more levels of tension; and ratios of the one or more times-of-flight of UT longitudinal waves and the one or more times-of-flight of UT shear waves at each of the one or more levels of tension.

In embodiments of the first aspect, determining the one or more times-of-flight of UT longitudinal waves in the test bolt corresponding to one or more levels of tension comprises, for each of the one or more levels of tension: receiving, from a transducer, raw data relating to reflections of UT longitudinal waves in the test bolt, wherein the raw data comprises at least a first echo and a second echo; and evaluating the raw data to determine that it satisfies a first set of criteria.

In embodiments of the first aspect, at least one criterion of the first set of criteria is that the raw data is not clipped. In embodiments of the first aspect, at least one criterion of the first set of criteria is that the first echo arrives within an expected time range. In embodiments of the first aspect, at least one criterion of the first set of criteria is that a time separating an overall maximum peak and an overall minimum peak for the first echo, or a time separating an overall maximum peak and an overall minimum peak for the second echo, or both, are below a threshold. In embodiments of the first aspect, at least one criterion of the first set of criteria is that a peak-to-noise ratio of the raw data is above a threshold.

In embodiments of the first aspect, the method further comprises evaluating the raw data by calculating one or more times-of-flight of longitudinal waves from the raw data and determining that the one or more times-of-flight meet a second set of criteria. In an embodiment of the first aspect, at least one criterion of the second set of criteria is that the times-of-flight are within an expected range. In embodiments of the first aspect, at least one criterion of the second set of criteria is that each time-of-flight does not deviate from any other time-of-flight by an amount greater than a threshold.

In embodiments of the first aspect, determining one or more times-of-flight of UT shear waves in the test bolt corresponding to one or more levels of tension comprises, for each of the one or more levels of tension: receiving, from a transducer, raw data relating to reflections of UT shear waves in the test bolt, wherein the raw data comprises at least a first echo and a second echo; and evaluating the raw data to determine that it satisfies a first set of criteria.

In embodiments of the first aspect, at least one criterion of the first set of criteria is that the raw data is not clipped. In embodiments of the first aspect, at least one criterion of the first set of criteria is that the first echo arrives within an expected time range. In embodiments of the first aspect, at least one criterion of the first set of criteria is that a time separating an overall maximum peak and an overall minimum peak for the first echo, or a time separating an overall maximum peak and an overall minimum peak for the second echo, or both, are below a threshold. In embodiments of the first aspect, at least one criterion of the first set of criteria is that a peak-to-noise ratio of the raw data is above a threshold.

In embodiments of the first aspect, the method further comprises evaluating the raw data by calculating one or more times-of-flight of longitudinal waves from the raw data and determining that the one or more times-of-flight meet a second set of criteria. In embodiments of the first aspect, at least one criterion of the second set of criteria is that the times-of-flight are within an expected range. In embodiments of the first aspect, at least one criterion of the second set of criteria is that each time-of-flight does not deviate from any other time-of-flight by an amount greater than a threshold.

In embodiments of the first aspect, wherein determining, for each of the plurality of test bolts, ratios of the one or more times-of-flight of UT longitudinal waves and the one or more times-of-flight of UT shear waves comprises analyzing the one or more times-of-flight of UT longitudinal waves to identify which times-of-flight are suitable for calculating a longitudinal wave time-of-flight, wherein the suitable times-of-flight are those times-of-flight that meet a third set of criteria; analyzing the one or more times-of-flight of UT shear waves to identify which times-of-flight are suitable for calculating a shear wave time-of-flight, wherein the suitable times-of-flight are those times-of-flight that meet the third set of criteria; determining that the number of suitable times-of-flight of UT longitudinal waves is above a threshold; determining that the number of suitable times-of-flight of UT shear waves is above a threshold; calculating an average longitudinal wave time-of-flight based on the suitable times-of-flight of UT longitudinal waves; calculating an average shear wave time-of-flight based on the suitable times-of-flight of UT shear waves; and calculating a ratio of the average longitudinal wave time-of-flight and the average shear wave time-of-flight.

In embodiments of the first aspect, the third set of criteria for longitudinal waves comprises determining that a difference between the maximum time-of-flight of UT longitudinal waves and the minimum time-of-flight of UT longitudinal waves is below a threshold. In embodiments of the first aspect, the third set of criteria for longitudinal waves comprises dividing the one or more times-of-flight of UT longitudinal waves into two or more groups and determining which group contains the most times-of-flight. In embodiments of the first aspect, the third set of criteria for longitudinal waves comprises dividing the one or more times-of-flight of UT longitudinal waves into two or more groups and determining which group contains the most times-of-flight based on overall echo maximums and overall echo minimums. In embodiments of the first aspect, the third set of criteria for longitudinal waves comprises dividing the one or more times-of-flight of UT longitudinal waves into two or more groups and determining which group contains the smallest difference between the minimum time-of-flight and the maximum time-of-flight from within each group. In embodiments of the first aspect, the third set of criteria for shear waves comprises determining that a difference between the maximum time-of-flight of UT shear waves and the minimum time-of-flight of UT shear waves is below a threshold. In embodiments of the first aspect, the third set of criteria for shear waves comprises dividing the one or more times-of-flight of UT shear waves into two or more groups and determining which group contains the most times-of-flight. In embodiments of the first aspect, the third set of criteria for shear waves comprises dividing the one or more times-of-flight of UT shear waves into two or more groups and determining which group contains the most times-of-flight based on overall echo maximums and overall echo minimums. In embodiments of the first aspect, the third set of criteria for shear waves comprises dividing the one or more times-of-flight of UT shear waves into two or more groups and determining which group contains the smallest difference between the minimum time-of-flight and the maximum time-of-flight from within each group.

In embodiments of the first aspect, determining a ratio of a time-of-flight of longitudinal waves and a time-of-flight of shear waves in a target bolt comprises causing a UT longitudinal wave to be generated in the target bolt; determining a time-of-flight of the longitudinal wave in the target bolt based on the UT longitudinal wave; causing a UT shear wave to be generated in the target bolt; determining a time-of-flight of the shear wave in the target bolt based on the UT shear wave; and determining a ratio of the time-of-flight of the longitudinal wave and the time-of-flight of the shear wave.

In a second aspect, a system for determining residual tension of a target bolt is provided. The system includes an ultrasonic longitudinal wave transducer configured to detachably couple to a bolt. The system further includes an ultrasonic shear wave transducer configured to detachably couple to a bolt. The system further includes a processing device configured to operatively connect to the longitudinal wave transducer and to the shear wave transducer, wherein the processing device is configured to receive data from the ultrasonic longitudinal wave transducer relating to ultrasonic longitudinal waves in a bolt and data from the ultrasonic shear wave transducer relating to ultrasonic shear waves in the bolt; and wherein the processing device comprises a processor coupled to memory, wherein the memory stores instructions that, when executed by the processor, cause the processor to perform the method of the first aspect and/or any one or more of its embodiments.

In a third aspect, a processing device for determining residual tension in a target bolt is provided. The processing device includes an input module configured to receive data from an ultrasonic longitudinal wave transducer relating to ultrasonic longitudinal waves in a bolt and data from an ultrasonic shear wave transducer relating to ultrasonic shear waves in the bolt; a display for displaying a graphical user interface (GUI), wherein the GUI is configured to receive data relating to the bolt; and a processor coupled to memory, wherein the memory stores instructions that, when executed by the processor, cause the processor to perform the method of the first aspect and/or any one or more of its embodiments.

In a fourth aspect, a non-transitory computer readable medium including computer-executable instructions stored thereon, which, when executed by a processor, cause the processor to perform the method of the first aspect and/or any one or more of its embodiments.

In a fifth aspect, a method of determining residual tension in a target bolt is provided. The method includes selecting a plurality of test bolts. The method further includes setting each of the plurality of test bolts to a plurality of tension values. The method further includes, for each tension value of each test bolt, determining a ratio of a time-of-flight of shear waves and a time-of-flight of longitudinal waves in the test bolt. The method further includes determining a ratio of a time-of-flight of shear waves and a time-of-flight of longitudinal waves in a target bolt. The method further includes determining residual tension in the target bolt, which is not one of the plurality of test bolts, based on at least the time-of-flight ratios of the plurality of test bolts and the time-of-flight ratio of the target bolt.

In embodiments of the fifth aspect, setting each of the plurality of test bolts to a plurality of tension values comprises setting each of the plurality of test bolts to zero tension and to at least one other tension value.

In embodiments of the fifth aspect, for each tension value of each test bolt, determining the ratio of a time-of-flight of a shear wave and a time-of-flight of a longitudinal wave comprises generating an ultrasonic (UT) shear wave in the test bolt; determining a time-of-flight of the shear wave in the test bolt based on the UT shear wave; generating an UT longitudinal wave in the test bolt; determining a time-of-flight of the longitudinal wave in the test bolt based on the UT longitudinal wave; and determining a ratio of the time-of-flight of the shear wave and the time-of-flight of the longitudinal wave.

In embodiments of the fifth aspect, the method further comprises modeling the time-of-flight ratios of the plurality of test bolts as a function of the plurality of tension values;

and determining residual tension in the target bolt based on the model and the time-of-flight ratio of the target bolt. In embodiments of the fifth aspect, modeling the time-of-flight ratios of the plurality of test bolts as a function of the plurality of tension values comprises using regression analysis. In embodiments of the fifth aspect, modeling the time-of-flight ratios of the plurality of test bolts as a function of the plurality of tension values comprises utilizing the equation $ToF_{ratio}=A-BT$, where $ToF_{ratio}$ is the ratio of the time-of-flight of a shear wave and the time-of-flight of a longitudinal wave; T is the tension value; and A and B are constants. In embodiments of the fifth aspect, determining residual tension in the target bolt based on at least the model and the time-of-flight ratio of the target bolt comprises: utilizing the equation $$T_R = \frac{A - ToF_{ratio}}{B},$$

where $T_R$ is the residual tension of the target bolt to be determined; $ToF_{ratio}$ is the ratio of the time-of-flight of the shear wave in the target bolt and the time-of-flight of the longitudinal wave in the target bolt; and A and B are constants.

In embodiments of the fifth aspect, the method further comprises computing a plurality of tensile stress values based on the plurality of tension values; modeling the time-of-flight ratios of the plurality of test bolts as a function of the plurality of tensile stress values; and determining residual tension in the target bolt based on the model and the time-of-flight ratio of the target bolt. In embodiments of the fifth aspect, modeling the time-of-flight ratios of the plurality of test bolts as a function of the plurality of tensile stress values comprises using regression analysis. modeling the time-of-flight ratios of the plurality of test bolts as a function of the plurality of tensile stress values comprises utilizing the equation $ToF_{ratio}=C-D\sigma$, where $ToF_{ratio}$ is the ratio of the time-of-flight of a shear wave and the time-of-flight of a longitudinal wave; $\sigma$ is the tensile stress value; and C and D are constants. In embodiments of the fifth aspect, determining residual tension of the target bolt based on at least the model and the time-of-flight ratio of the target bolt comprises utilizing the equation $$\sigma_R = \frac{C - ToF_{ratio}}{D},$$

where $\sigma_R$ is the tensile stress associated with the residual tension of the target bolt; $ToF_{ratio}$ is the ratio of the time-of-flight of the shear wave in the target bolt and the time-of-flight of the longitudinal wave in the target bolt; and C and D are constants.

In a sixth expect, a method of determining residual tension of a target bolt disposed on a wind turbine tower, wherein the tower comprises a plurality of bolts joining structural members together, includes selecting a subset of the plurality of bolts as test bolts. The method further includes, for each test bolt, setting the test bolt to a plurality of tension values; and for each tension value, measuring a time-of-flight of longitudinal waves in the test bolt; measuring a time-of-flight of shear waves in the test bolt; and calculating the ratio of the time-of-flight of longitudinal waves and time-of-flight of shear waves in the test bolt. The method further includes modeling the ratios of times-of-flight in the test bolt and the tension values set in each test bolt. The method further includes measuring a time-of-flight of longitudinal waves in a target bolt. The method further includes measuring a time-of-flight of shear waves in the target bolt. The method further includes calculating the ratio of the time-of-flight of longitudinal waves and time-of-flight of shear waves in the target bolt. The method further includes determining residual tension of the target bolt by determining an approximate tension value in the model that corresponds to the value of the ratio of the time-of-flight of longitudinal waves and time-of-flight of shear waves measured in the target bolt.

In embodiments of the sixth aspect, the plurality of tension values set in each test bolt are converted to tensile stress values, and wherein the method further comprises modeling the ratios of times-of-flight in the test bolts as a function of the tensile stress values.

It will be appreciated that any embodiment of any aspect is generally applicable with some or all embodiments of any other aspect or with any aspect. That is, any embodiment is independently combinable with any of the aspects or embodiments identified herein, regardless of whether a combination of those embodiments or aspects are specifically identified herein.

DRAWINGS

The foregoing and other objects, features, and advantages of the systems and methods described herein will be apparent from the following description of particular embodiments thereof, as illustrated in the accompanying figures, where like reference numbers refer to like structures. The figures are not necessarily to scale, emphasis instead being placed upon illustrating the principles of the systems and methods described herein.

DESCRIPTION

Figure 1:
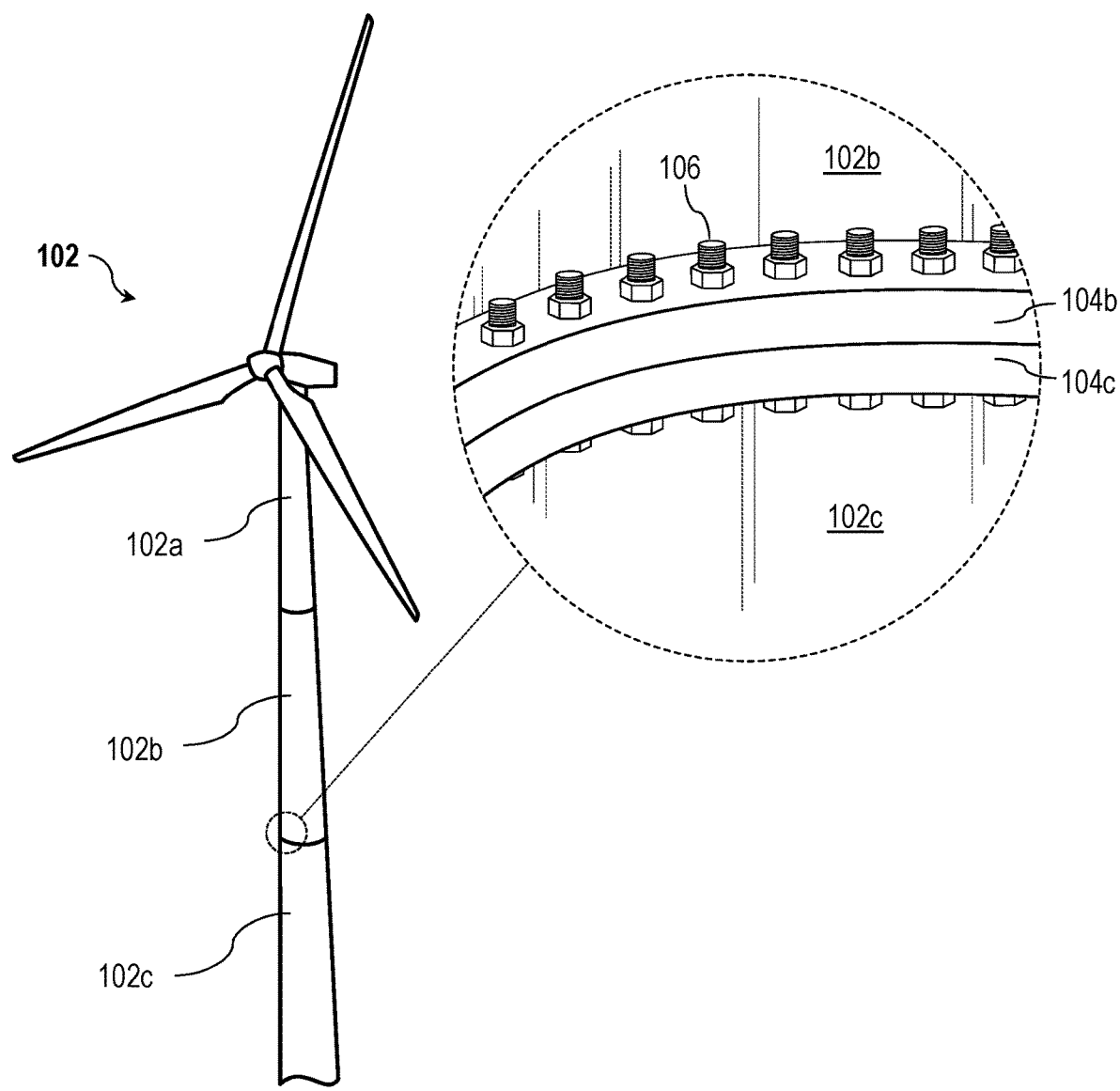
FIG. 1 is an enlarged, schematic diagram illustrating an example wind tower and bolts used thereon.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms unless otherwise stated or clear from context.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or "the like") provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage or mode of operation.

As used herein, the term "data" is a broad term and is to be given its ordinary and customary meaning to a person of ordinary skill in the art, and refers without limitation to any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

As used herein, the terms "memory" and "memory device" are broad terms and are to be given their ordinary and customary meaning to a person of ordinary skill in the art, and refer without limitation to computer hardware or circuitry to store information. Memory or memory device can be any suitable type of computer memory or other electronic storage means including, for example, read-only memory (ROM), random access memory (RAM), dynamic RAM (DRAM), static RAM (SRAM), ferroelectric RAM (FRAM), cache memory, compact disc read-only memory (CDROM), electro-optical memory, magneto-optical memory, masked read-only memory (MROM), programmable read-only memory (PROM), erasable programmable read-only memory (EPROM), electrically-erasable programmable read-only memory (EEPROM), rewritable read-only memory, flash memory, or the like. Memory or memory device can be implemented as an internal storage medium and/or as an external storage medium. For example, memory or memory device can include hard disk drives (HDDs), solid-state drives (SSDs), optical disk drives, plug-in modules, memory cards (e.g., xD, SD, miniSD, microSD, MMC, etc.), flash drives, thumb drives, jump drives, pen drives, USB drives, zip drives, a computer readable medium, or the like.

As used herein, the term "network" is a broad term and is to be given its ordinary and customary meaning to a person of ordinary skill in the art, and refers without limitation to any communication network including, for example, an extranet, intranet, inter-net, the Internet, local area network (LAN), wide area network (WAN), metropolitan area network (MAN), wireless local area network (WLAN), ad hoc network, wireless ad hoc network (WANET), mobile ad hoc network (MANET), or the like.

As used herein, the term "processor" is a broad term and is to be given its ordinary and customary meaning to a person of ordinary skill in the art, and refers without limitation to processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, microprocessors, microcontrollers, programmable devices and systems, field-programmable gate arrays (FPGA), application-specific integrated circuits (ASIC), systems on a chip (SoC), systems comprising discrete elements and/or circuits, state machines, virtual machines, data processors, processing facilities, digital signal processing (DSP) processors, and combinations of any of the foregoing. A processor can be coupled to, or integrated with, memory or a memory device.

Figure 2:
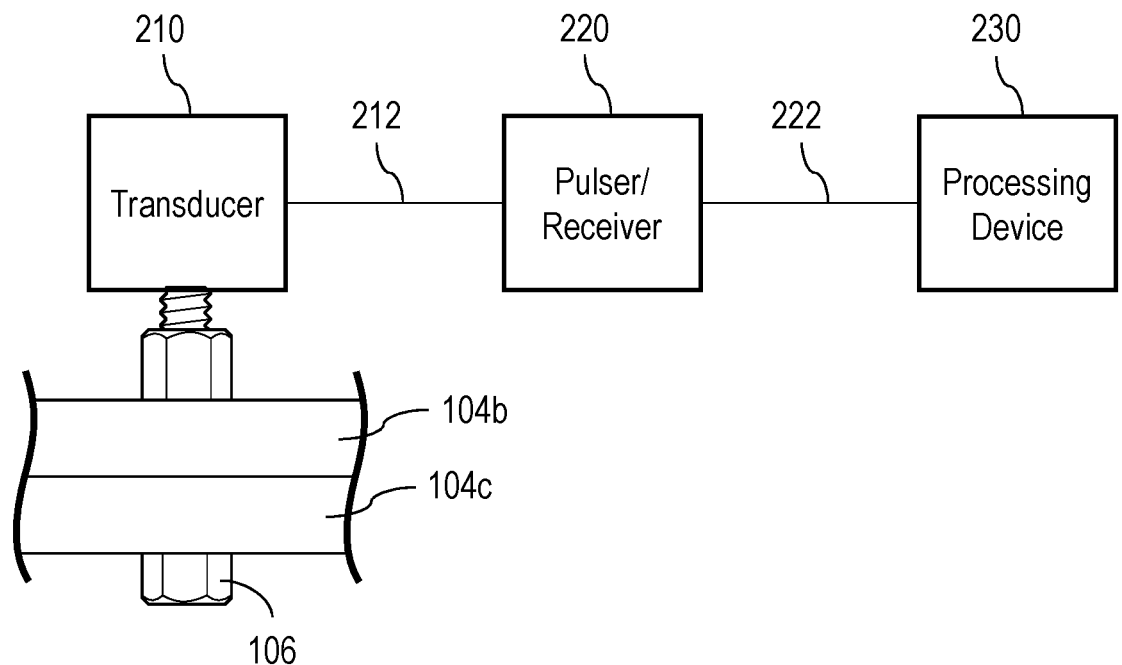
FIGS. 2 and 3 are schematic diagrams illustrating an example setups of systems for determining the residual tension or tensile stress of a bolt.

FIG. 2 is a schematic diagram illustrating an example setup of a system for determining the residual tension of a bolt 106. The system can include a transducer 210 that is detachably coupled to bolt 106. In some embodiments, a couplant may be used at the transducer/bolt interface. The couplant can be a gel-like material that facilitates the transmission of energy (e.g., ultrasonic energy) from the transducer 210 to the bolt 106. The couplant can help minimize or eliminate the impedance mismatch that exists between the air and the transducer/bolt interface. Transducer 210 can also be detachably coupled to bolt 106 with a coupling member (not shown) to place the transducer in a consistent location on a bolt each time a test event is conducted. In some embodiments, transducer 210 can be an ultrasonic transducer. In some embodiments, transducer 210 can be a shear wave transducer that generates and/or receives shear waves. In some embodiments, transducer 210 can be a longitudinal wave transducer that generates and/or receives longitudinal waves. In some embodiments, transducer 210 can be a single transducer that simultaneously generates and/or receives shear and longitudinal waves. In some embodiments, transducer 210 can be a contact transducer. In some embodiments, transducer 210 can have a nominal diameter of 0.125 inches, 0.250 inches, 0.375 inches, 0.500 inches, 0.750 inches, 1.00 inches, and the like. In some embodiments, transducer 210 can generate ultrasonic waves having frequencies of about 500 kHz, 750 kHz, 1 MHz, 1.25 MHz, 1.5 MHz, 1.75 MHz, 2 MHz, 2.25 MHz, 2.50 MHz 2.75 MHz, 3 MHz, 3.5 MHz, 5 MHz, 7.5 MHz, 10 MHz, 15 MHz, 20 MHz, 50 MHz, 100 MHz, and the like.

Transducers typically require a signal to trigger a test event and generate an acoustic wave. Transducer 210 can be triggered, for example, with pulser/receiver 220 as illustrated in FIG. 2. For example, pulser/receiver 220 can be used to transmit electrical signals to transducer 210, such as a pulse of voltages, which transducer 210 can convert into physical disturbances, such as ultrasonic waves. Pulser/receiver 220 can also be used to receive, amplify, process, and/or store signals received from transducer 210, which signals can represent physical disturbances received by transducer 210. Pulser/receiver 220 can be operatively connected to transducer 210 via communication medium 212. Communication medium 212 can be any medium capable of communicating signals and/or data between transducer 210 and pulser/receiver 220 including a wired or wireless connection. For example, in some embodiments, communication medium 212 can comprise one or more transmission lines, such as coaxial transmission lines. In some embodiments, communication medium 212 can comprise a wireless link that utilizes a suitable wireless technology such as, for example, a radio frequency (RF) technology, near field communication (NFC), Bluetooth, Bluetooth Low Energy, IEEE 802.11x (i.e., Wi-Fi), Zigbee, Z-Wave, Infrared (IR), cellular, and other types of wireless technologies. Communication medium 212 can also comprise a combination of both wired and/or wireless technologies.

In some embodiments, pulser/receiver 220 can transmit pulses to transducer 210 without external input. For example, pulser/receiver 220 can be programmed to autonomously transmit pulses to transducer 210 and receive data from transducer 210 corresponding to a test event.

In some embodiments, pulser/receiver 220 can transmit pulses to transducer 210 based on external input. For example, FIG. 2 illustrates processing device 230 operatively connected to pulser/receiver 220 via transmission medium 222. Processing device 230 can be a personal computer, laptop, tablet, smart device, and other processing devices. In some embodiments, processing device 230 can be located locally near pulser/receiver 220 (e.g., at worksite). In some embodiments, processing device 230 can be a networked device that is not located locally near pulser/receiver 220, but is connected to pulser/receiver 220 over a network (e.g., off-site). Processing device 230 can include one or more processors and memory. The memory can store software that, when executed by the one or more processors, causes pulser/receiver 220 to transmit pulses to transducer 210 to generate acoustic waves. In this way, processing device 230 can provide input to pulser/receiver 220 to cause pulser/receiver 220 to generate electrical pulses and trigger transducer 210 to generate and receive acoustic waves.

As illustrated, pulser/receiver 220 can be operatively connected to processing device 230 via communication medium 222. Communication medium 222 can be any medium capable of communicating signals and/or data between pulser/receiver 220 and processing device 230 including a wired or wireless connection. For example, in some embodiments, communication medium 222 can comprise one or more transmission lines, such as a coaxial transmission line, a USB cable, Ethernet cable, and the like. In some embodiments, communication medium 222 can comprise a wireless link that utilizes a suitable wireless technology such as, for example, a radio frequency (RF) technology, near field communication (NFC), Bluetooth, Bluetooth Low Energy, IEEE 802.11x (i.e., Wi-Fi), Zigbee, Z-Wave, Infrared (IR), cellular, and other types of wireless technologies. Communication medium 222 can also comprise a combination of both wired and/or wireless technologies.

In the system illustrated in FIG. 2, processing device 230 can receive raw data from pulser/receiver 220 in response to a test event. The raw data can include data relating to ultrasonic waves reflected from the distal end of the bolt 106 (i.e., end of the bolt opposite of where transducer 210 is detachably coupled), including but not limited to, amplitude, phase, frequency, time, and the like. Pulser/receiver 220, processing device 230, or both, can amplify, process, and/or store the raw data. In some embodiments, processing device 230 can process the raw data with one or more software applications to determine whether the raw data is usable to calculate a $ToF_{ratio}$, to develop a model of $ToF_{ratio}$ as a function of tension or tensile stress, and to determine tension or tensile stress in one or more bolts 106. These software applications are explained more fully below.

Figure 3:
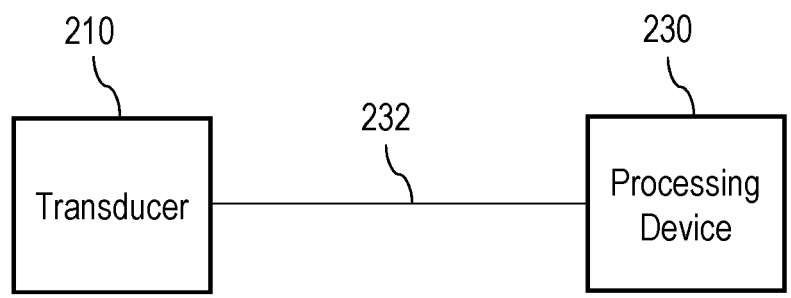

While FIG. 2 illustrates pulser/receiver 220 and processing device 230 as two separate units, it will be appreciated that they may be one physical unit as shown in FIG. 3. For example, in some embodiments, processing device 230 incorporates the hardware, firmware, and software of pulser/receiver 220 illustrated in FIG. 2 that is needed to trigger transducer 210 and to receive signals and/or data from transducer 210 corresponding to a test event. In the embodiment shown in FIG. 3, processing device 230 can be connected to transducer 210 via communication medium 232. Communication medium 232 can be any medium capable of communicating signals and/or data between transducer 210 and processing device 230 including a wired or wireless connection. For example, in some embodiments, communication medium 232 can comprise one or more transmission lines, such as a coaxial transmission line, a USB cable, Ethernet cable, and the like. In some embodiments, communication medium 232 can comprise a wireless link that utilizes a suitable wireless technology such as, for example, a radio frequency (RF) technology, near field communication (NFC), Bluetooth, Bluetooth Low Energy, IEEE 802.11x (i.e., Wi-Fi), Zigbee, Z-Wave, Infrared (IR), cellular, and other types of wireless technologies. Communication medium 232 can also comprise a combination of both wired and/or wireless technologies.

Figure 4:
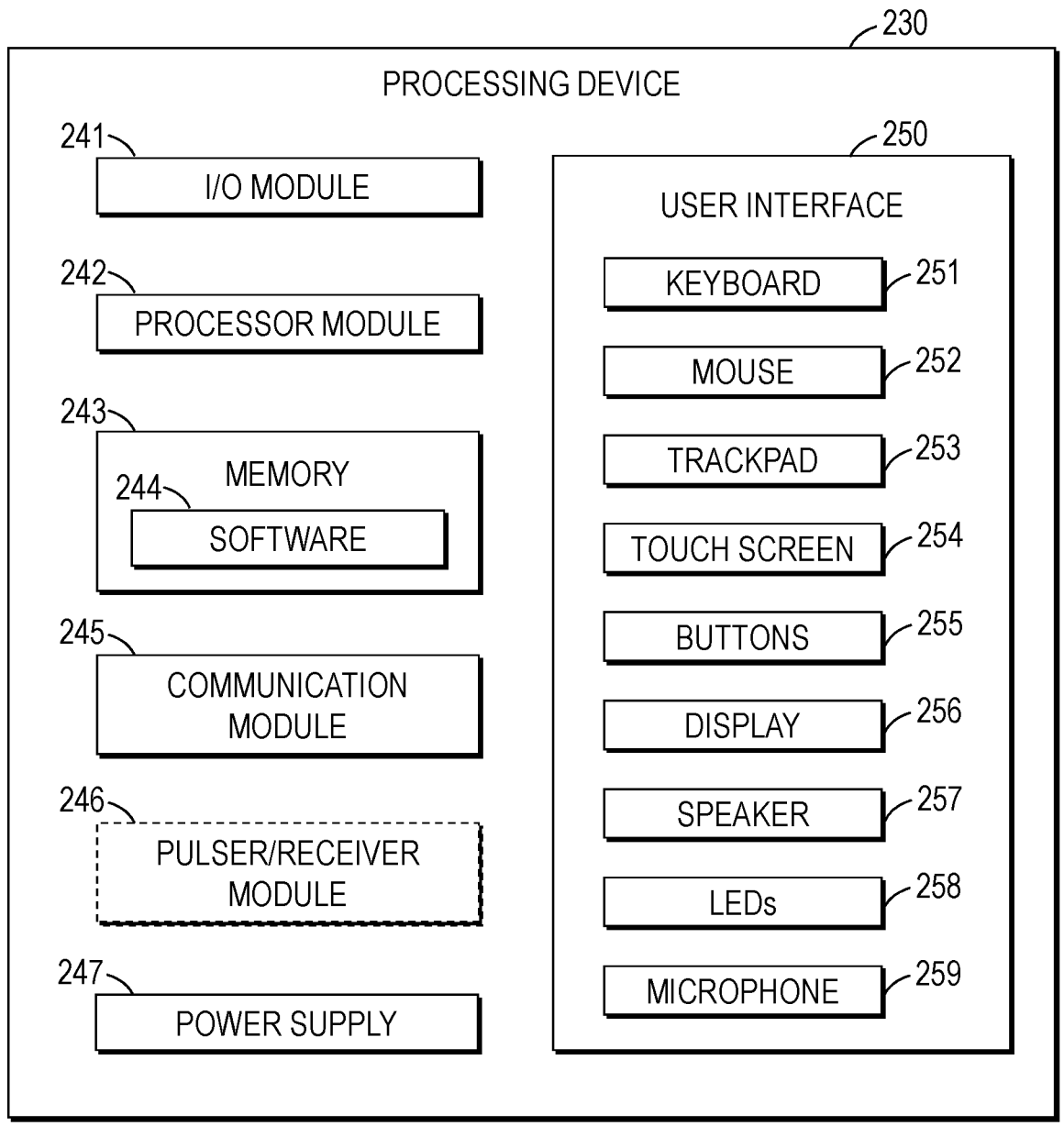
FIG. 4 is a block diagram illustrating an example processing device.

Processing device 230 (illustrated in FIG. 2 or 3) can include hardware, firmware, and/or software that generally enables a user to interact with the system, to receive raw data from transducer 210 and/or pulser/receiver 220, to process the raw data, to analyze the raw data, to store the raw data as well as other data, and/or to transmit data (e.g., raw data, processed data, etc.) to an external system (not shown). FIG. 4 illustrates a more detailed block diagram of an example processing device 230, such as that shown in FIG. 2 or 3. The processing device 230 can receive raw data via an input/output (I/O) module 241. The I/O module 241 can send the raw data to processor module 242.

Processor module 242 can be coupled to one or more memory devices 243. The one or more memory devices 243 can store data, such as the raw data from transducer 210 or pulser/receiver 220, data received from a user, data received from an external system, and other types of data (e.g., configuration data, etc.). The one or more memory devices 243 can also store software 244 (i.e., computer-executable instructions). Processor module 242 can process data, wherein the processing can include, for example, amplifying, converting from analog to digital or digital to analog, conditioning, filtering, and/or transforming the data. Processor module 242 can also serve as a central control unit of processing device 230. For example, software 244 can comprise operating system software, firmware, and other system software for controlling processing device 230 and its components. Software 244 can further include data processing software, application software, or the like, as discussed in more detail below.

Processing device 230 can include a user interface 250 that comprises input and output components configured to allow a user to interact with processing device 230 and the system generally. For example, user interface 250 can include a keyboard 251, mouse 252, trackpad 253, touch-sensitive screen 254, one or more buttons 255, display 256, speaker 257, one or more LED indicators 258, and microphone 259. Processor module 242 can control user interface 250 and its components. For example, processor module 242 can receive data and commands from input components through I/O module 241 and provide data and commands to output components through I/O module 241. Processor module 242 can execute software 244 stored in the one or more memory devices 243 to cause a graphical user interface (GUI) to be displayed on display 246. The GUI can provide the user with an intuitive and user-friendly means for interacting with the system, including to provide output to the user such as prompts, messages, notifications, warnings, alarms, or the like.

The components of the user interface 250 include controls to allow a user to interact with processing device 230. For example, the keyboard 251, mouse 252, and trackpad 253 can allow input from the user. The touch-sensitive screen 254 can enable a user to interact with the GUI, for example, by inputting information, making selections, or the like. The one or more buttons 255 can provide for quick and easy selection of options or modes, such as by toggling functions on/off. Buttons 255 can be physical buttons on processing 230 or soft buttons that appear on the GUI. The display 256 can be any type of display, such as an LCD, LED, OLED, or the like. The display 256 can provide the user with visual output. The speaker 257 can provide the user with audible output, such as by alerting the user of notifications, warnings, alarms, or the like. The one or more LED indicators 258 can provide the user with visual indications. For example, one LED indication might represent whether there is sufficient battery power, or whether processing device 230 is receiving power from an external source. Another LED indication might inform the user whether the processing device 230 is in an active state during a test event. The microphone 259 can provide a user with the capability to control processing device 230 by voice. Although not illustrated, the user interface 250 can include other components, such as a vibrating module to provide a user with tactile signals or alerts, a backlight to facilitate viewing the display in low light conditions, or the like.

As further illustrated in FIG. 4, processing device 230 can include communication module 245, which can comprise components, such as transceivers, drivers, antennas, and the like, to enable communication with various types of devices and systems. For example, communication module 245 can include Ethernet ports, USB ports, and ports for communicating over RS-232, RS-422, RS-485, and other protocols. Communication module 245 can further include antennas and other components typically used for wireless communication, such analog frontend circuitry, A/D converters, amplifiers, filters, and the like. Communication module 245 can enable communication with an external system. For example, an external system may send commands or data to, or receive commands or data from, processing device 230. Communication module 245 may also enable processing device 230 to receive software updates. Thus, communication module 245 can be a two-way communication module that enables processing device to communicate with pulser/receiver 220 (e.g., FIG. 2), transducer 210 (FIG. 3), or an external system (not shown), as well as other devices.

As further illustrated in FIG. 4, processing device 230 can include an optional pulser/receiver module 246. For example, as explained in connection with FIG. 3, in some embodiments, processing device 230 can be operatively connected to transducer 210 without an external pulser/receiver to trigger transducer 210. Thus, the functionality of pulser/receiver 220 as shown and described in connection with FIG. 2 may be incorporated directly into processing device 230 as optional pulser/receiver module 246.

As further illustrated in FIG. 4, processing device 230 can include a power supply 247, which can include rechargeable or disposable batteries. Power supply 247 may also include circuitry to receive power from an external source and to supply the necessary power to processing device 230, such as through an AC adapter. In some embodiments, the external source can be a computer that supplies power to processing device 230 over a USB cable.

Processing device 230 can support various other functions. For example, in some embodiments, processing device 230 can include the ability to record and playback test events received from transducer 210 and/or pulser/receiver 220, while also permitting for real-time display of the events. In some embodiments, processing device 230 can include the ability to tag events as they occur. For example, processing device 230 can include one or more buttons 255 that enables a user to insert a marker onto the raw data in real-time. In some embodiments, processing device 230 can permit remote control and monitoring. For example, processing device 230 can be communicatively coupled to an external system to enable the external system to view test events in real time and to control processing device 230.

It should be noted that FIG. 4 is a block diagram and not a strict architectural diagram. Thus, FIG. 4 generally illustrates example components in processing device 230, some of which may be combined and some of which may be separated. For example, some or all of the functionality of the I/O module 241 might be combined with some or all of the functionality of the communication module 245 and vice versa. As another example, communication module 245 may comprise several individual modules, some of which may communicate with pulser/receiver 220 (e.g., FIG. 2) via wired or wireless connections, while others may communicate with transducer 210 (e.g., FIG. 3) via wired or wireless connections. As yet another example, processor module 242 may comprise several components, such as processing elements for amplifying, converting, conditioning, filtering, and transforming data, and a microprocessor and/or microcontroller for controlling processing device 230 (in addition to performing other functions, such as further processing data). These components can be implemented with discrete circuits or with integrated circuits. Further, the blocks illustrated in FIG. 4 are communicatively coupled in an appropriate manner as would be appreciated by one of ordinary skill in the art. For example, the components can be communicatively coupled with a bus topology. Thus, commands, data, and other information received from the I/O module 241 and communication module 245 could be transmitted to processor module 242 for processing, storing, and or other action. Similarly, processor 242 could transmit commands, data, and other information to I/O module 241 and communication module 245, as appropriate, to be further communicated to other components, such as pulser/receiver 220 (e.g., FIG. 2), transducer 210 (e.g., FIG. 3), an external system, and user interface 250 and its components.

Software 244 on processing device 230 can be programmed to perform a variety of functions. For example, as explained above, software 244 can comprise instructions that, when executed by processor module 242, cause processor module 242 to generate a graphical user interface (GUI) on display 256. The GUI can allow a user to interact with the system. Software 244 can further comprise instructions that, when executed by processor module 242, cause processor module 242 to receive input data from the user, receive raw data from pulser/receiver 220 (e.g., FIG. 2) or transducer 210 (e.g., FIG. 3), process the data, and analyze the data, for example, to determine whether the data is usable or suitable for calculating a $ToF_{ratio}$, to calculate times-of-flight, to provide feedback to the user, etc. This is explained in more detail below.

Software 244 can further comprise instructions that, when executed by processor module 242, cause processor module 242 to analyze the raw data to create a model of $ToF_{ratio}$ as a function of tension or tensile stress. For example, software 244 can include a machine learning algorithm that uses regression analysis to create the model. This is explained in more detail below.

Software 244 can further comprise instructions that, when executed by processor module 242, cause processor module 242 to analyze $ToF_{shear}$ and $ToF_{longitudinal}$ to determine residual tension or tensile stress in a bolt 106. This is explained in more detail below.

It should be noted that software 244 described herein is not limited to residing on, or being executed by, processing device 230. Instead, some or all of the software may reside on or be executed by an external system. As one non-limiting example, software 244 on processing device 230 may receive raw data from pulser/receiver 220 (e.g., FIG. 2) or transducer 210 (e.g., FIG. 3). Software 244 on processing device 230 can process the raw data and provide feedback about whether the raw data is usable or suitable to calculate a $ToF_{ratio}$. After a positive determination is made, the raw data can be analyzed in real time on processing device 230. Alternatively or additionally, the raw data, once verified to be usable or suitable for calculating a $ToF_{ratio}$, can be stored and analyzed at a later time. As another alternative, the raw data can be communicated to an external system, which can include software that analyzes the raw data (in real time or at a later time) to determine a $ToF_{ratio}$. Thus, the inventions disclosed herein contemplate a distributed architecture in which raw data can be obtained from transducer 210 and analyzed on site, off site, or a combination of both.

In some embodiments, the systems illustrated in FIGS. 2 and 3 can include other components such as an oscilloscope or a spectrum analyzer. These components can be the processing device 230 illustrated in FIG. 2 or 3, or can be connected to processing device 230. Further, processing device 230 can be connected to one or more servers, remote computing devices, the cloud, or a network, such as a private network or the Internet.

Figure 5:
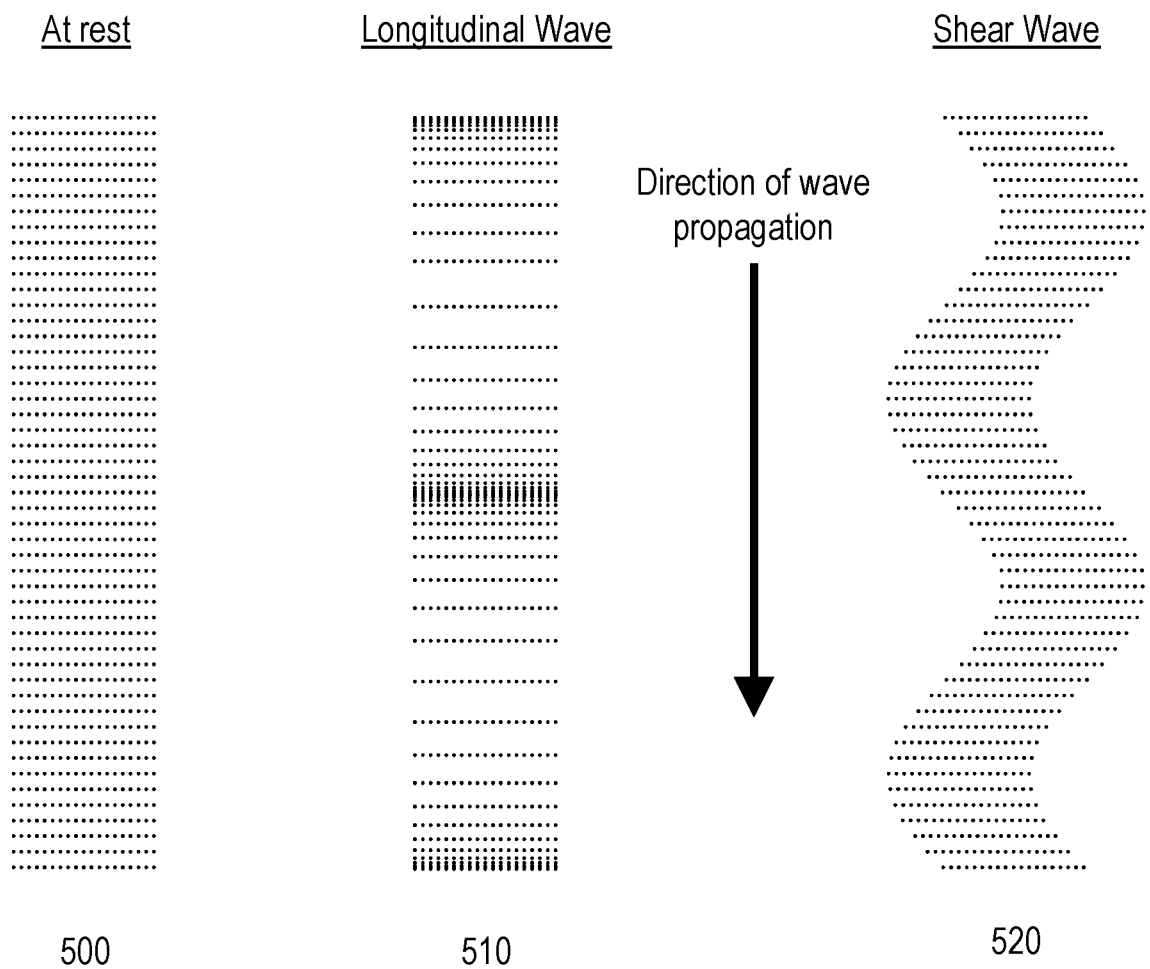
FIG. 5 is a schematic diagram illustrating different wave phenomena in an elastic object.

FIG. 5 is a schematic diagram illustrating different wave phenomena in an elastic object, such as in a bolt. For example, diagram 500 illustrates particles in an elastic object when the object is at rest. In this simplified and idealized diagram, the particles are generally evenly spaced throughout the object. Diagram 510 illustrates a longitudinal wave (sometimes referred to as a compression wave) in the object. As illustrated in diagram 510, the longitudinal wave causes the particles in the object to oscillate in the same direction as the wave propagation. For example, when a disturbance is created in the object that causes a downward wave propagation, a longitudinal wave will cause the particles to undergo compression (e.g., the closely-spaced particles in diagram 510) and rarefaction (e.g., the farther-spaced particles in diagram 510). In contrast, diagram 520 illustrates a shear wave (sometimes referred to as a transverse wave) in the object. As illustrated in diagram 520, the shear wave causes the particles in the object to oscillate perpendicular to the direction of wave propagation.

The inventive systems and methods disclosed herein are based, in part, on these different wave phenomena. In particular, the time that it takes a longitudinal wave and shear wave to travel from one end of a bolt and reflect back ($ToF_{longitudinal}$ and $ToF_{shear}$, respectively) can be measured and correlated with residual tension and/or tensile stress of the bolt. Specifically, the ratio of $ToF_{shear}$ and $ToF_{longitudinal}$ can be used to model tension and/or tensile stress as a function of $ToF_{ratio}$ and to estimate tension and/or tensile stress by measuring $ToF_{ratio}$. It is to be noted that $ToF_{ratio}$ can be expressed as $ToF_{shear}/ToF_{longitudinal}$ or as $ToF_{longitudinal}/ToF_{shear}$. Moreover, because tensile stress is tension per cross-sectional area, one can determine the $ToF_{ratio}$ as a function of tension if tensile stress is known and vice versa, e.g., using the nominal cross-sectional area of the bolts as published by the manufacturers.

Measuring $ToF_{ratio}$. The times-of-flight for shear and longitudinal waves can be measured using ultrasonic waves. For example, transducer 210 can be an ultrasonic transducer that generates ultrasonic waves in a bolt, and the time that it takes for the wave to reflect back (i.e., echo) can be measured. Sometimes, however, the raw data produced from such a test event may not be usable or suitable to accurately measure a time-of-flight for a longitudinal wave or a shear wave, or to calculate the ratio. Even if the times-of-flight can be measured, the results over a series of test events or among multiple echoes from one test event may not be consistent, thereby making a model built from such data less accurate. These issues can occur, for example, if there are air pockets at the transducer/bolt interface, which a couplant could help minimize. Other potential sources for inaccuracy or inconsistency are if the transducer is not located in the same place on a bolt for each test event, if the amount of couplant is not consistent for each test event (e.g., thickness of couplant layer), or if the amount of pressure applied to transducer 210 is not consistent for each test event.

To determine whether raw data from transducer 210 is usable or suitable, e.g., to calculate a ToF$_{ratio}$, to a generate model, or to determine residual tension or tensile stress, a software application can be used (e.g., on processing device 230). The application can analyze the raw data to determine whether it meets certain criteria. If the raw data fails to meet one or more criteria, the raw data can be rejected and additional data can be procured.

For example, in some embodiments, the systems of FIG. 2 or 3 may include a software application that is executed on processing device 230. The application may generate a GUI on processing device 230 that instructs the user to enter certain metadata about the bolt under investigation. For example, the application can ask the user to enter the geographical location of the bolt (e.g., ID of wind turbine tower, address of structure, etc.), at which portion of the structure the bolt is located (e.g., ring number 1, 2$^{nd}$ floor beam 1, etc.), and which bolt number is under investigation (e.g., to keep track of bolts). The application can further ask the user to enter the size of the bolt, the nominal length of the bolt, and the clamp length of the bolt (e.g., length of the bolt that is under tension, which typically refers to the total length minus the bolt head). Other metadata can also be collected, including, for example, temperature when a test event is conducted, material characteristics of the bolt, GPS coordinates, the name or initials of the user, etc. This metadata can be associated with the bolt under investigation.

The software application can further instruct the user to begin a test event, such as with a soft button. Once the test event begins, processing device 230 can generate and transmit electrical signals that cause transducer 210 either directly (e.g., FIG. 3) or through pulser/receiver 220 (e.g., FIG. 2) to generate and receive ultrasonic waves in the bolt. Processing device 230 can receive raw data resulting from the test event and analyze the raw data. If the raw data fails to meet one or more criteria, the application can provide a notification to the user that the data could not be validated and can provide feedback about why the data failed validation. The application can also provide the user with instructions about what to modify before conducting another test event, such as decreasing the gain, applying more pressure to the transducer, applying more couplant, moving the transducer to a new location on the bolt, etc. The user can then generate another test event and the new raw data can be analyzed to determine if it meets the criteria. Data that fails to meet the criteria can be discarded or stored in a location of memory. Data that passes the metrics can also be stored in memory and may be used to generate a model or to determine tension and/or tensile stress, as explained in more detail below. Additionally or alternatively, the software application can be executed on an external system. That is, raw data can be obtained from a work site, then analyzed off-site with an external system.

Figure 6:
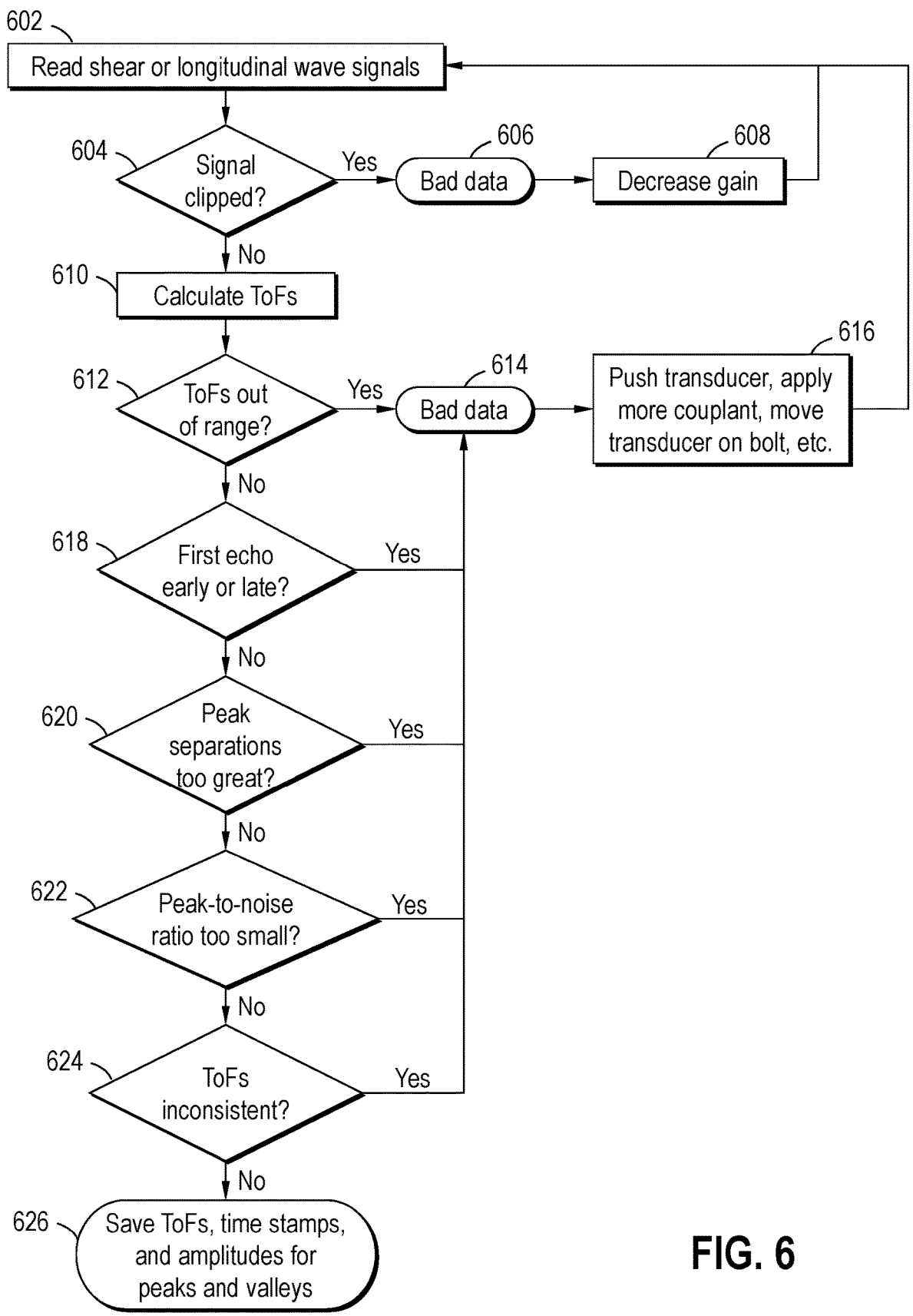
FIG. 6 is a flow diagram illustrating an example method for determining times-of-flight.

FIG. 6 is a flow diagram illustrating an example method with criteria that can be used to evaluate the raw data received from transducer 210 and to evaluate times-of-flight calculated therefrom. The flow diagram of FIG. 6 can be used with the systems of FIG. 2 or 3, as well as other systems.

Figure 7:
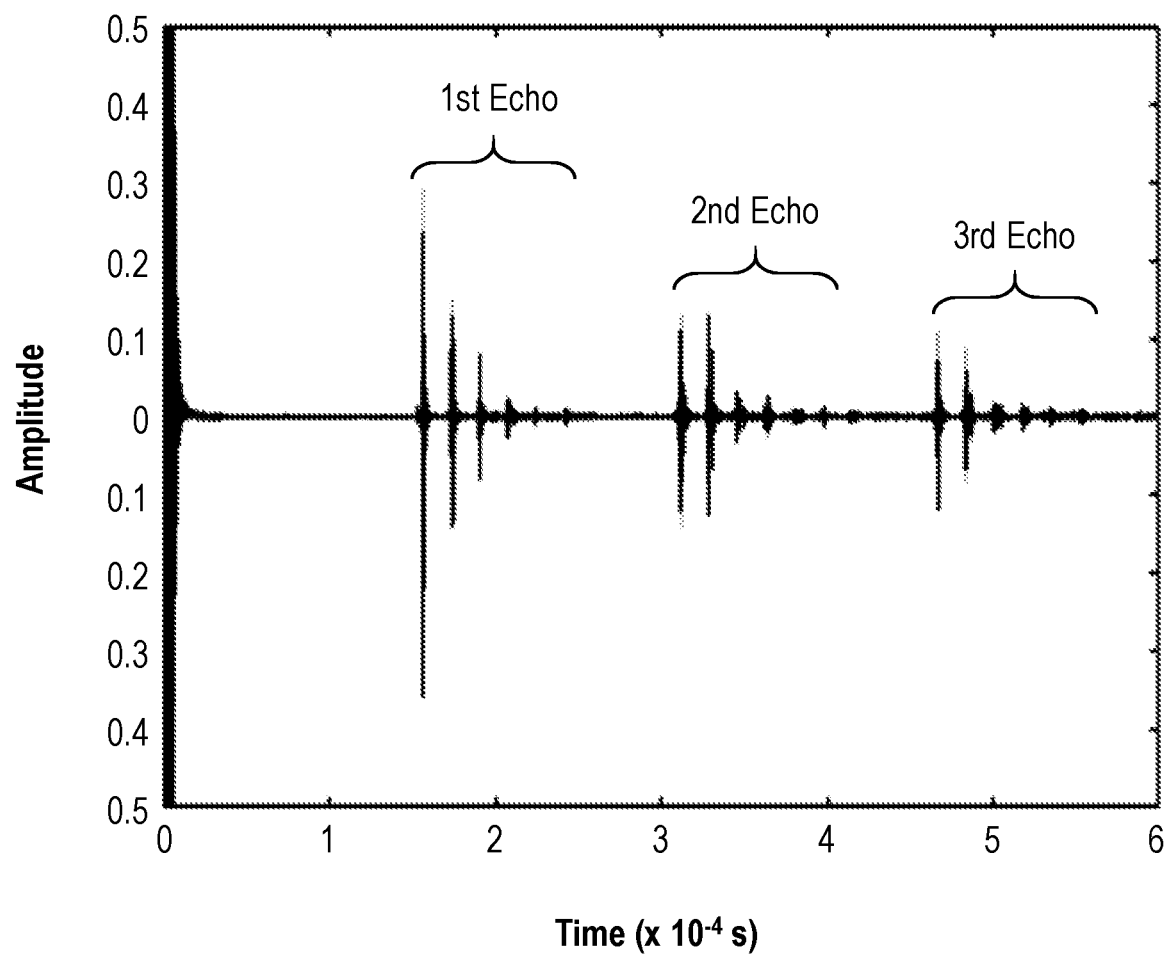
FIG. 7 is a graph diagram illustrating example echoes relating to longitudinal waves in a bolt.

At step 602, signals from transducer 210 corresponding to a test event are received. For example, in embodiments where transducer 210 is a longitudinal wave transducer, the signals received at step 602 may relate to echoes of longitudinal waves in bolt 106. In embodiments where transducer 210 is a shear wave transducer, the signals received at step 602 may relate to echoes of shear waves in bolt 106. In embodiments where transducer 210 is a combination longitudinal wave and shear wave transducer, the signals received at step 602 may relate to echoes of longitudinal waves and shear waves in bolt 106. The signals received at step 602 may be received by pulser/receiver 220, processing device 230, or both. The signals received at step 602 may comprise raw data relating to amplitude, phase, frequency, and time of the echoes. For example, FIG. 7 is a graph diagram illustrating typical raw data that corresponds to longitudinal wave echoes in a bolt. Raw data corresponding to shear waves would result in a similar diagram. In FIG. 7, three echoes are illustrated; however, any number of echoes can be captured during a test event.

Returning to FIG. 6, raw data received at step 602 can be analyzed at step 604 to evaluate whether the signal is clipped. This can happen when the amplitude of the raw data exceeds the operating range of the transducer 210. If it is determined at step 604 that the raw data is clipped, the raw data is considered bad data at step 606. The method can proceed to step 608 and instructions can be provided to the user (e.g., via a notification on the GUI) to reduce the gain of the transducer 210. With decreased gain, another test event can be conducted and the method restarts at step 602 by receiving another set of raw data.

If it is determined at step 604 that the signal is not clipped, the raw data may be used to calculate times-of-flight at step 610. Preferably, one time-of-flight for longitudinal waves and one time-of-flight for shear waves will be calculated for each test event. However, the raw data for each test event can be analyzed to calculate multiple times-of-flight based on different points of the resulting waveforms, then used to calculate a single time-of-flight for each of longitudinal waves and shear waves, for example, by finding the averages.

Figure 8:
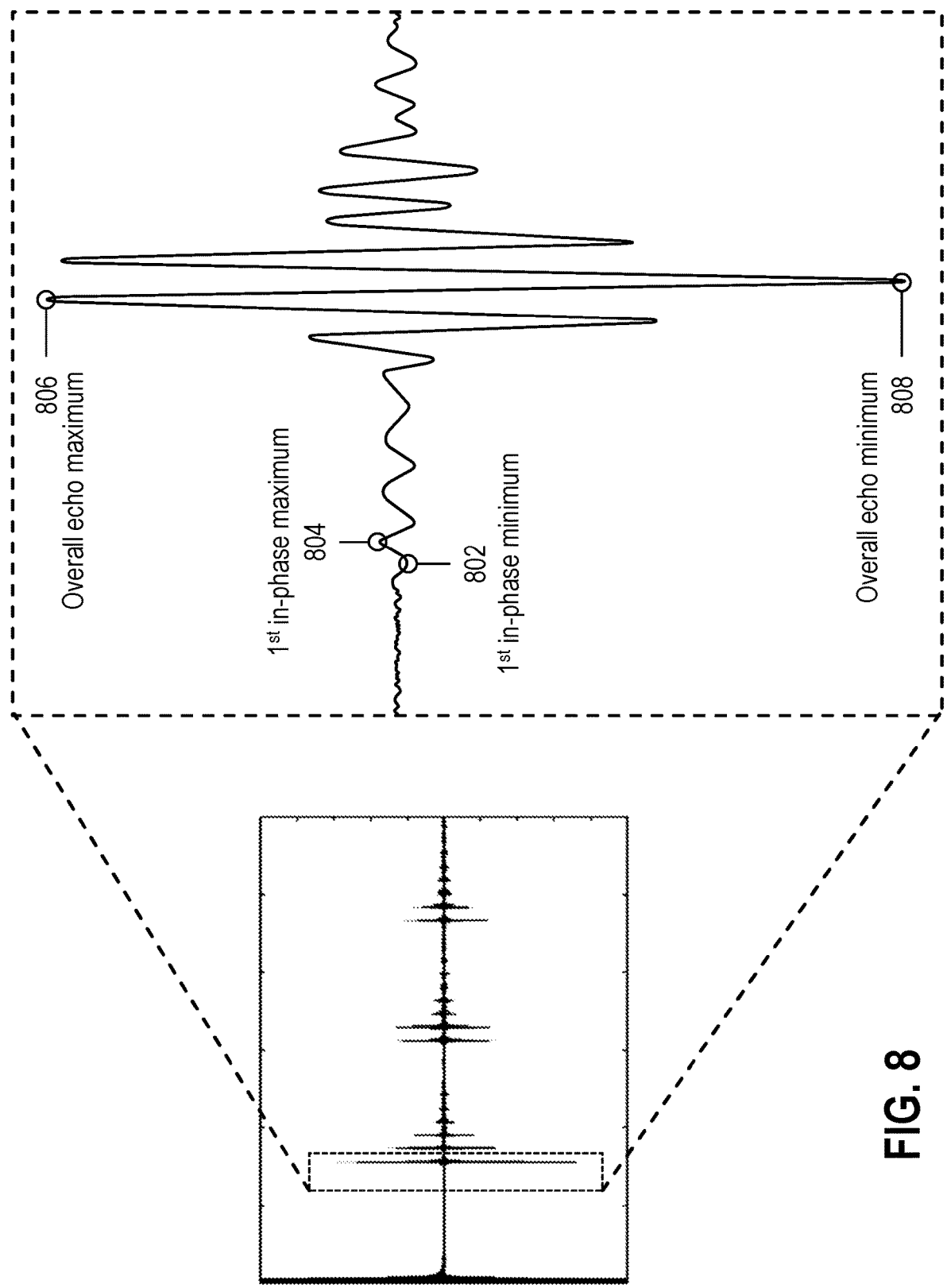
FIG. 8 is a graph diagram illustrating a portion of the waveforms illustrated in FIG. 7.

For example, FIG. 8 illustrates an enlarged view of a portion of the first echo that is illustrated in FIG. 7. As illustrated, each echo will typically contain a first in-phase minimum 802, a first in-phase maximum 804, an overall echo maximum 806, and an overall echo minimum 808. The distance from each of these points to the corresponding points along the next echo waveform can be used to calculate times-of-flight. This is illustrated, in FIGS. 9A and 9B.

Figure 9A:
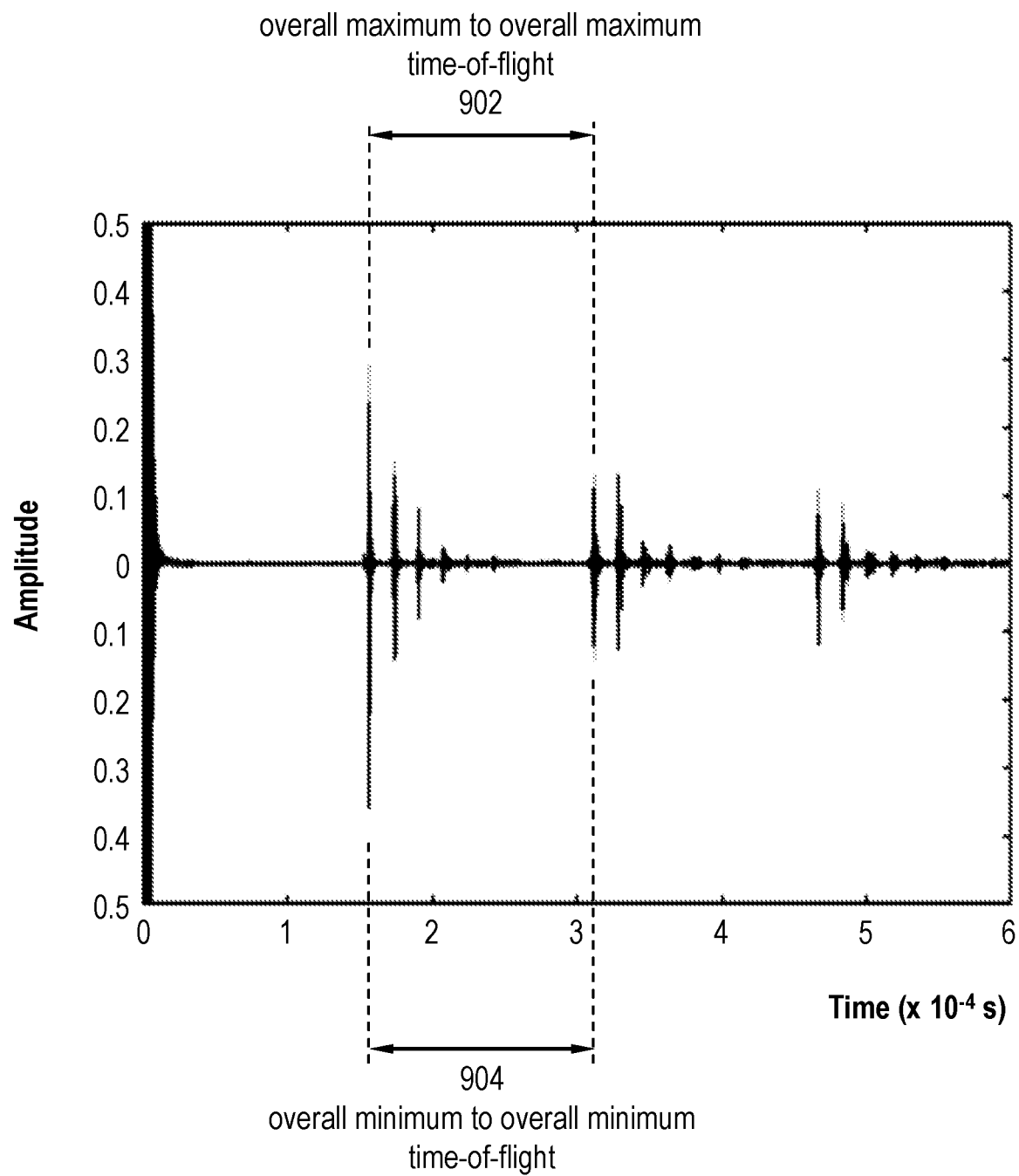
FIGS. 9A and 9B are graph diagram illustrating times-of-flight measurements.
Figure 9B:
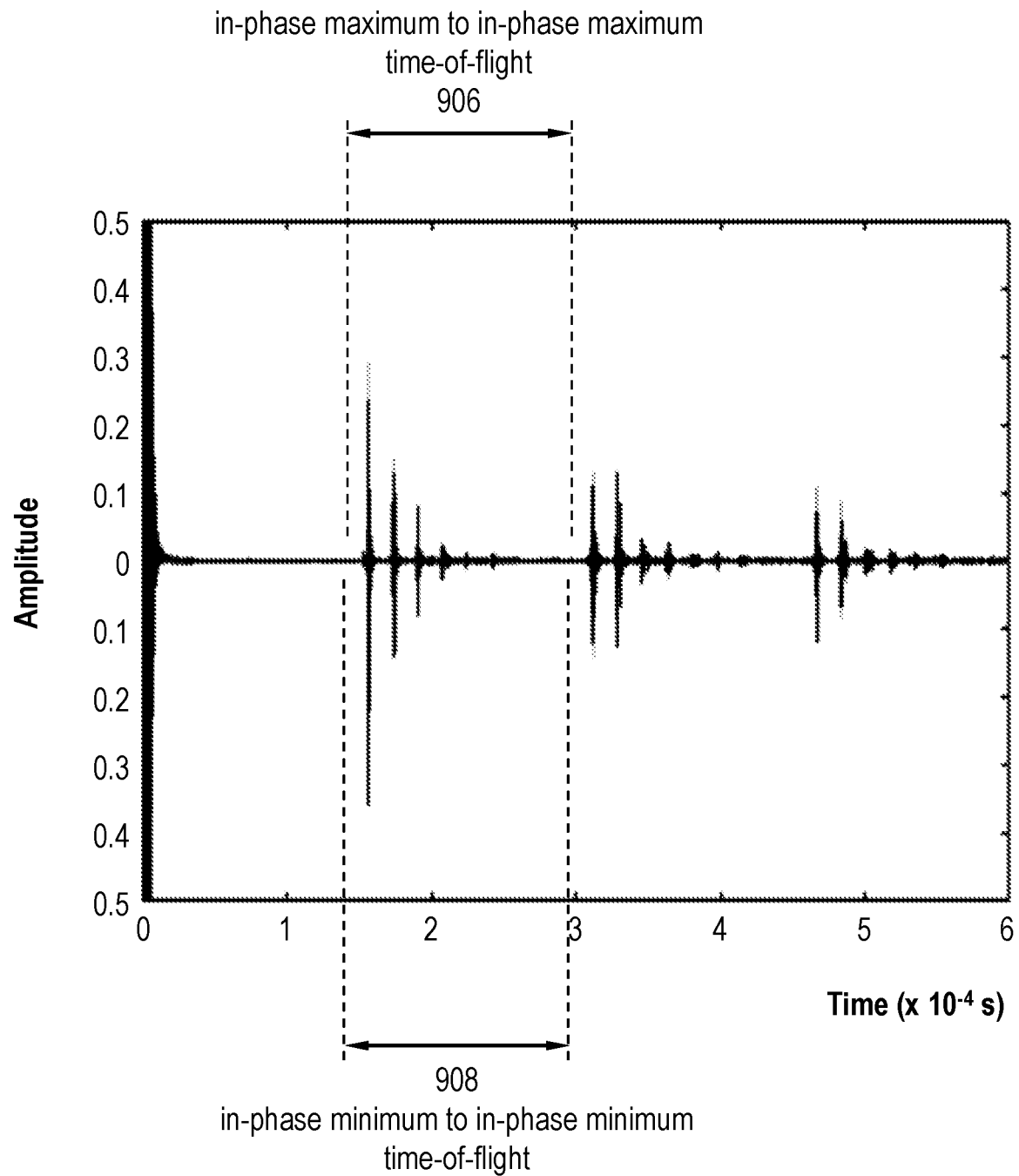

FIG. 9A is a graph diagram illustrating the raw data of FIG. 7. As illustrated, a time-of-flight 902 can be calculated based on the overall maximum of the first echo to the overall maximum of the second echo. As further illustrated, a time-of-flight 904 can be calculated based on the overall minimum of the first echo to the overall minimum of the second echo. It will be appreciated that additional times-of-flight can be calculated based on the overall maximums and overall minimums of the second to third echoes, third to fourth echoes, fourth to fifth echoes, and so on. FIG. 9B is another graph diagram illustrating the raw data of FIG. 7. As illustrated, a time-of-flight 906 can be calculated based on the in-phase maximum of the first echo (see FIG. 8) to the in-phase maximum of the second echo. As further illustrated, a time-of-flight 908 can be calculated based on the in-phase minimum of the first echo (see FIG. 8) to the in-phase minimum of the second echo. As will also be appreciated, additional times-of-flight can be calculated based on the in-phase maximums and in-phase minimums of the second to third echoes, third to fourth echoes, fourth to fifth echoes, and so on. Thus, at least four times-of-flight can be calculated from any two echoes. It will be appreciated that times-of-flight can also be calculated based on other points of the echoes, and that times-of-flight can be based on non-consecutive echoes, such as echoes 1 and 3, 2 and 5, and so on.

Returning to FIG. 6, at step 610, multiple times-of-flight can be calculated for each test event as explained in connection with FIGS. 8-9. For example, in one embodiment, three longitudinal wave echoes are received from which eight different times-of-flight are calculated (e.g., overall max to overall max for $1^{st}$ to $2^{nd}$ echo and $2^{nd}$ to $3^{rd}$ echo; overall min to overall min for $1^{st}$ to $2^{nd}$ echo and $2^{nd}$ to $3^{rd}$ echo; in-phase max to in-phase max for $1^{st}$ to $2^{nd}$ echo and $2^{nd}$ to $3^{rd}$ echo; and in-phase min to in-phase min for $1^{st}$ to $2^{nd}$ echo and $2^{nd}$ to $3^{rd}$ echo). At step 612, each of the times-of-flight can be analyzed to determine whether they are out of range. For example, based on the approximate velocity for the wave and the approximate length of the bolt, it is possible to calculate an approximate range of elapsed time in which the time-of-flight is expected. If, at step 612, any time-of-flight is out of range, the data is considered bad at step 614. The method can proceed to step 616 and instructions can be provided to the user (e.g., via a notification on the GUI) to push the transducer and apply more pressure, to apply more couplant at the bolt/transducer interface, or to move the transducer to a new location on the bolt. After adjustments are made, another test event can be conducted and the method can restart at step 602 by receiving another set of raw data.

If, at step 612, it is determined that the times-of-flight are in range, at step 618, the first echo can be analyzed to determine whether it occurs too early or too late. For example, based on the approximate velocity for the wave and the approximate length of the bolt, it is possible to calculate an approximate range of time when the first echo should occur. If, at step 618, it is determined that the first echo occurred too early or too late (i.e., out of range), the data is considered bad at step 614. The method can proceed to step 616 and instructions can be provided to the user (e.g., via a notification on the GUI) to push the transducer and apply more pressure, to apply more couplant at the bolt/transducer interface, or to move the transducer to a new location on the bolt. After adjustments are made, another test event can be conducted and the method can restart at step 602 by receiving another set of raw data.

If, at step 618, it is determined that the first echo occurred within an expected timeframe, at step 620, the echoes can be analyzed to determine whether aspects of the echoes are within an expected range and consistent. For example, the time separating the overall positive (maximum) peak and the overall negative (minimum) peak for each echo (806 and 808 in FIG. 8) can be analyzed to determine whether the times are within an expected range. Other aspects of the echoes can also be used, such as, for example, the time separating the in-phase maximum and the in-phase minimum. If, at step 620, it is determined that any time separations are greater than a threshold, the data is considered bad at step 614. The method can proceed to step 616 and instructions can be provided to the user (e.g., via a notification on the GUI) to push the transducer and apply more pressure, to apply more couplant at the bolt/transducer interface, or to move the transducer to a new location on the bolt. After adjustments are made, another test event can be conducted and the method can restart at step 602 by receiving another set of raw data.

If, at step 620, it is determined that the time separations are less than the threshold, at step 622, it can be determined whether the peak-to-noise ratio is too small for each of the echoes, which could be an indication of a noisy signal. If the peak-to-noise ratio is too small for any of the echoes, the data is considered bad at step 614. The method can proceed to step 616 and instructions can be provided to the user (e.g., via a notification on the GUI) to push the transducer and apply more pressure, to apply more couplant at the bolt/transducer interface, or to move the transducer to a new location on the bolt. After adjustments are made, another test event can be conducted and the method can restart at step 602 by receiving another set of raw data.

If, at step 622, it is determined that the peak-to-noise ratios of each of the echoes are above a threshold, it can be determined at step 624 whether any of the times-of-flight are inconsistent with the other times-of-flight calculated (e.g., deviate too much comparatively). For example, the times-of-flight can be compared against one another and if any two times-of-flight deviate by an amount greater than a threshold, the times-of-flight may be inconsistent. If, at step 624, it is determined that any of the times-of-flight are inconsistent, the data is considered bad at step 614. The method can proceed to step 616 and instructions can be provided to the user (e.g., via a notification on the GUI) to push the transducer and apply more pressure, to apply more couplant at the bolt/transducer interface, or to move the transducer to a new location on the bolt. After adjustments are made, another test event can be conducted and the method can restart at step 602 by receiving another set of raw data.

If, at step 624, it is determined that the times-of-flight calculated are not inconsistent, the method can proceed to step 626 and data corresponding to the times-of-flight can be saved, including, for example, the times-of-flight measured, and time stamps and amplitudes corresponding to peaks and valleys for each of the waveforms. This data can be used to find a $ToF_{longitudinal}$, $ToF_{shear}$, and $ToF_{ratio}$. Other data can also be saved, such as the results of each of the checks performed. It should be noted that the steps shown in FIG. 6 need not be performed in the order shown, nor must all of the steps be performed. Indeed, one of the purposes of performing the steps illustrated in FIG. 6 is to filter out bad data from data that is usable to find times-of-flight. Thus, one or more of the steps may be performed as desired to obtain such a data set.

Figure 10:
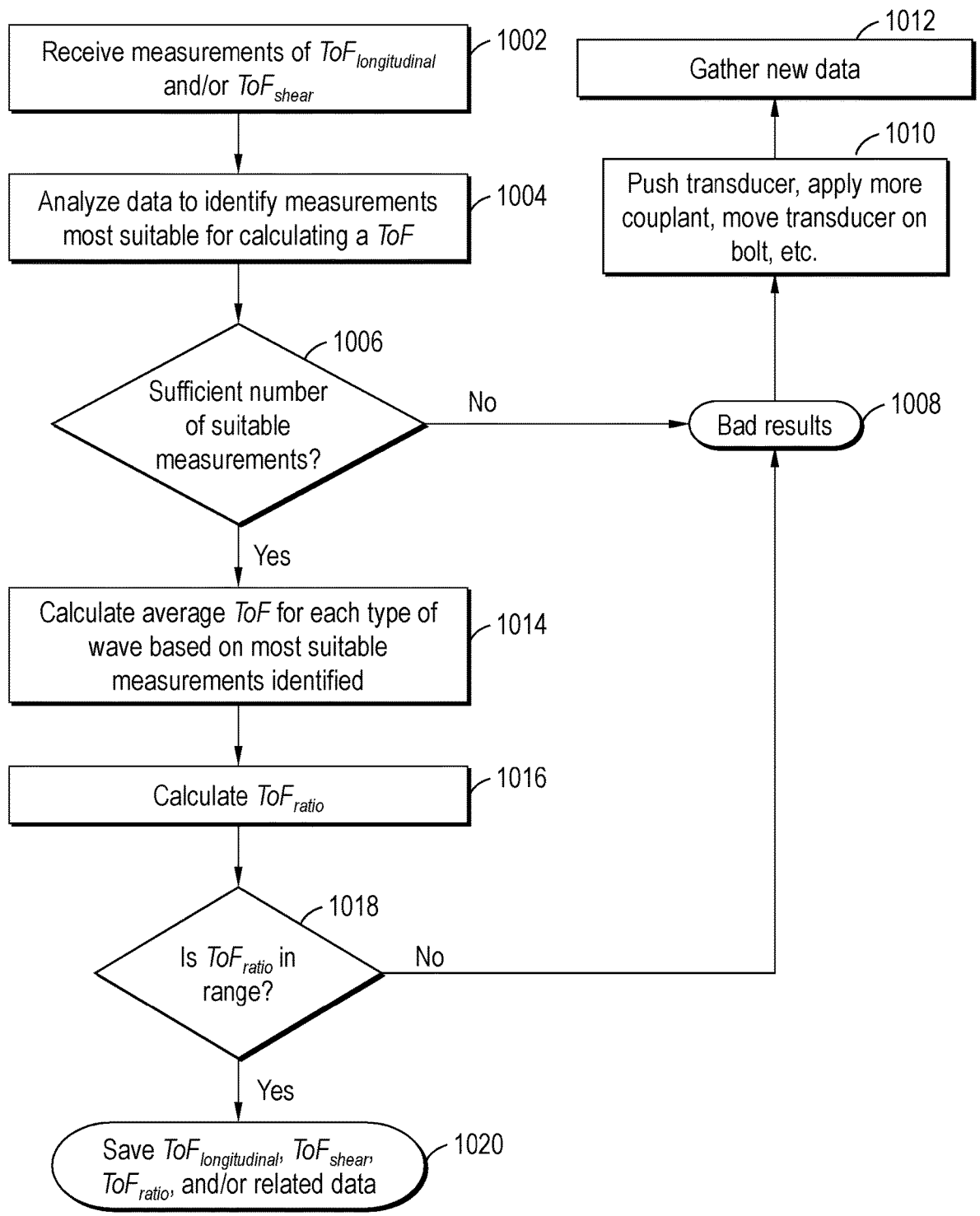
FIG. 10 is a flow diagram illustrating an example method for determining times-of-flight.

Data sets comprising multiple measurements of $ToF_{longitudinal}$ and $ToF_{shear}$ can be used to calculate a value for $ToF_{longitudinal}$, a value for $ToF_{shear}$, and/or a value for $ToF_{ratio}$. The value of $ToF_{ratio}$, for example, can be used to create a model with respect to tension or tensile stress, or to calculate the value of tension or tensile stress from a model. FIG. 10 is a flow diagram illustrating an example method for calculating $ToF_{longitudinal}$, $ToF_{shear}$, and $ToF_{ratio}$ from one or more data sets comprising multiple measurements of $ToF_{longitudinal}$ and/or $ToF_{shear}$.

Referring to FIG. 10, at step 1002, data comprising measurements of $ToF_{longitudinal}$ and/or $ToF_{shear}$ can be received. For example, these data sets may be received after performing the method of FIG. 6. If the measurements of $ToF_{longitudinal}$ and $ToF_{shear}$ are received at step 1002 as one data set, then the measurements for each of the different wave types can be grouped into separate data sets to be analyzed separately. If the measurements of $ToF_{longitudinal}$ and $ToF_{shear}$ are received at step 1002 as separate data sets, or if only $ToF_{longitudinal}$ measurements are received, or if only $ToF_{shear}$ measurements are received, then there may be no need to separate the data into groups based on waveform type for the subsequent analysis.

Figure 11:
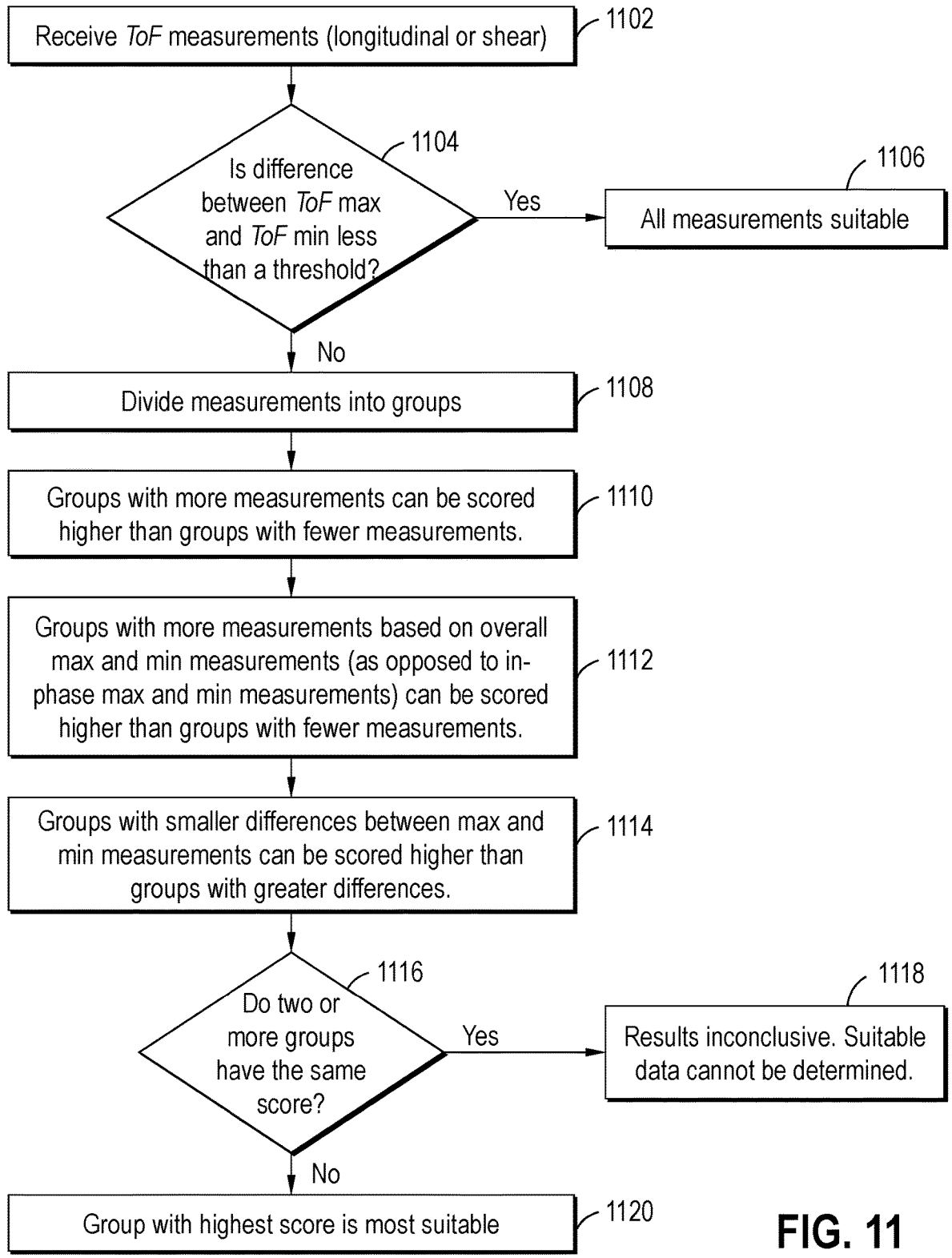
FIG. 11 is a flow diagram illustrating an example method for identifying suitable measurements for calculating a time-of-flight.

At step 1004, the data can be analyzed to identify which ToF measurements (i.e., measurements for longitudinal waves, shear waves, or both) are most suitable for calculating a ToF (i.e., $ToF_{longitudinal}$, $ToF_{shear}$, or both). That is, if the method of FIG. 10 is performed on only measurements of $ToF_{longitudinal}$, then the data received at 1002 can be analyzed at step 1004 to identify the most suitable measurements for calculating a value of $\text{ToF}_{longitudinal}$. If the method of FIG. 10 is performed on only measurements of $\text{ToF}_{shear}$, then the data received at step 1002 can be analyzed at step 1004 to identify the most suitable measurements for calculating a value of $\text{ToF}_{shear}$. If the method of FIG. 10 is performed on measurements of both $\text{ToF}_{longitudinal}$ and $\text{ToF}_{shear}$ received at step 1002, then the measurements can be separated as explained above, then analyzed separately at step 1004 (i.e., analyze measurements of $\text{ToF}_{longitudinal}$ together; analyze measurements of $\text{ToF}_{shear}$ together). Generally, the most suitable ToF measurements will comprise times-of-flight that are closely spaced in time. This will tend to indicate consistent times-of-flight and more accurate times-of-flight. One example for determining the most suitable ToF measurements are those measurements that fall within an expected range for the ToF. Other examples for identifying the most suitable ToF measurements are explained in connection with FIG. 11 below.

At step 1006, the number of suitable measurements found at step 1004 can be analyzed. If it is determined at step 1006 that there are not a sufficient number of measurements, e.g., the number of measurements are below a threshold, then the data can be deemed not sufficient at step 1008. The method can proceed to step 1010 and instructions can be provided to the user (e.g., via a notification on the GUI) to push the transducer and apply more pressure, to apply more couplant at the bolt/transducer interface, to move the transducer to a new location on the bolt, etc. After adjustments are made, another test event can be conducted at step 1012. At this point the method of FIG. 10 ends and the method of FIG. 6 can be restarted by receiving another set of raw data. It should be noted that if only one waveform type failed to satisfy the criteria at step 1006, the measurements for that waveform type can be disregarded while the measurements for the other waveform type can be retained. Alternatively, all measurements can be disregarded and new raw data measurements for both waveform types can be obtained.

If it is determined at step 1006 that there are a sufficient number of suitable measurements, at step 1014, the average times-of-flight can be calculated based on the ToF measurements found most suitable in step 1004. For example, an average ToF for longitudinal waves can be calculated from the most suitable ToF longitudinal wave measurements and the average ToF for shear waves can be calculated from the most suitable ToF shear wave measurements. At step 1016, the ratio of the average $\text{ToF}_{longitudinal}$ and average $\text{ToF}_{shear}$ can be calculated. This can be expressed as $\text{ToF}_{longitudinal}/\text{ToF}_{shear}$ or $\text{ToF}_{shear}/\text{ToF}_{longitudinal}$.

At step 1018, the $\text{ToF}_{ratio}$ can be analyzed to determine whether it is inside or outside of an expected (i.e., theoretical) range. If the $\text{ToF}_{ratio}$ is outside the expected range, the data is considered to have produced bad results at step 1008. The method can proceed to step 1010 and instructions can be provided to the user (e.g., via a notification on the GUI) to push the transducer and apply more pressure, to apply more couplant at the bolt/transducer interface, to move the transducer to a new location on the bolt, etc. After adjustments are made, another test event can be conducted at step 1012. At this point the method of FIG. 10 ends and the method of FIG. 6 can be restarted by receiving another set of raw data.

If it is determined at step 1018 that the $\text{ToF}_{ratio}$ is within an expected range, the method can proceed to step 1020 and the data can be saved, which data can include all $\text{ToF}_{longitudinal}$ measurements, the most suitable $\text{ToF}_{longitudinal}$ measurements, the average $\text{ToF}_{longitudinal}$, all $\text{ToF}_{shear}$ measurements, the most suitable $\text{ToF}_{shear}$ measurements, the average $\text{ToF}_{shear}$, $\text{ToF}_{ratio}$, and other related data. This information can be used to model $\text{ToF}_{ratio}$ as a function of tension or tensile stress, or to calculate tension or tensile stress based on a model as explained in more detail below.

As noted above, there are numerous different criteria that can be used to identify ToF measurements most suitable for calculating a time-of-flight (e.g., $\text{ToF}_{longitudinal}$ and/or $\text{ToF}_{shear}$). One example is the method of FIG. 11, which is a flow diagram for identifying suitable ToF measurements. The method of FIG. 11 can be used, for example, in connection with step 1004 of the method of FIG. 10.

At step 1102, ToF measurements can be received (e.g., measurements for $\text{ToF}_{longitudinal}$ and/or measurements for $\text{ToF}_{shear}$). At step 1104, the difference between the maximum ToF measurement and the minimum ToF measurement can be analyzed to determine whether it is less than a threshold amount. If the difference is less than the threshold, all measurements can be deemed suitable at step 1106 and the method of FIG. 11 can end. This would indicate that all ToF measurements are (relatively) closely spaced and therefore all measurements can be used to calculate a time-of-flight.

If it is determined at step 1104 that the difference between the maximum and minimum ToF measurement is greater than the threshold, the method can proceed to step 1108 by dividing the measurements into groups to be analyzed separately. There are numerous different ways to group the measurements. One example is simply to divide the measurements evenly into separate groups (e.g., 5 subgroups of 8 measurements). Another example is to divide the time that separates the maximum and minimum measurements into segments, then to assign the measurements to each segment accordingly based on the difference from the minimum ToF measurement. For example, suppose that the maximum ToF measurement is 0.4 µs greater than the minimum ToF measurement. The range of 0.4 µs can be divided into 4 subgroups each spanning 0.1 µs. The measurements can then be assigned to each subgroup based on the difference from the minimum ToF measurement. As one hypothetical example in which 40 ToF measurements are received, 15 of the 40 ToF measurements might differ from the minimum ToF measurement by less than 0.1 is. These measurements can be assigned to a first group (including the minimum ToF measurement). Similarly, 20 of the 40 ToF measurements might differ from the minimum ToF measurement by an amount greater than 0.1 µs but less than 0.2 µs. These measurements can be assigned to a second group, and so on.

Another example of dividing the measurements into groups is to sort the measurements into ascending order, then to assign the measurements into groups based on which measurements are separated from subsequent measurements by the threshold amount. For example, returning to the hypothetical example in which 40 ToF measurements are received, the difference between the first measurement (minimum ToF measurement) and the second measurement can be calculated to determine if it is above or below the threshold. If it is below the threshold (which would typically mean that the first and second measurements are very close), then the difference between the first measurement and the third measurement can be calculated to determine if it is above or below the threshold. If that difference is also below the threshold (which would typically mean that it is very close to the first and second measurements), the fourth measurement can be analyzed and so on until a measurement is found that differs from the first measurement by an amount greater than the threshold. Each of the measurements preceding that measurement can be grouped into a first group. (It should be apparent that if all of the measurements differ from the first measurement by an amount less than the threshold, then the determination at step 1104 would have been satisfied and all measurements would be deemed suitable at step 1106). This process of analyzing each ascending measurement with respect to subsequent measurements can restart with the second measurement. That is, the difference between the second and third measurements can be analyzed to see if it is below the threshold and if so, the second and fourth measurements can be analyzed, and so on. Once a measurement is found that differs from the second measurement by an amount greater than the threshold, each of the measurements preceding that measurement can be grouped. This process can be repeated with the third measurement and subsequent measurements, then the fourth measurement and subsequent measurements, and so on. At the end of the process, there should be two or more groups that comprise measurements whose differences are all less than the threshold amount. The threshold amount can be any value. Some examples include 0.1 µs, 0.2 µs, 0.3 µs, 0.4 µs, 0.5 µs, 1 µs, 2 µs, and so on, including any lesser, greater, or intermediate value.

Regardless of how the measurements are grouped, at step 1110, each group can be analyzed to determine how many ToF measurements are included. Groups with more ToF measurements can be scored higher because that would tend to indicate several closely-spaced times-of-flight. Groups with fewer ToF measurements can be scored lower.

At step 1112, each group can be analyzed to determine how many ToF measurements are based on overall echo maximums or overall echo minimums. Times-of-flight based on overall maximums and minimums can be scored higher than those based on in-phase maximums and in-phase minimums. Thus, at step 1112, groups with more ToF measurements based on overall echo maximums and minimums can be scored higher than groups with fewer measurements.

At step 1114, each group can be analyzed to determine the time separating the maximum ToF measurement and minimum ToF measurement for the measurements within the group. Groups with smaller differences can be scored higher than groups with greater differences, as the smaller differences would indicate more closely-spaced times-of-flight.

At step 1116, it can be determined whether two or more groups resulted in the same score. If so, the results can be deemed inconclusive at step 1118. Suitable data for calculating the time-of-flight could not be determined because two groups resulted in the same score, thus making it difficult to determine which group comprised more reliable data. If it is determined at step 1116 that no two groups resulted in the same score, at step 1120, the group with the highest score can be deemed most suitable for calculating a time-of-flight. This group of measurements can be used, for example, in connection with step 1006 of the method of FIG. 10.

Modeling $ToF_{ratio}$ as a Function of Tension and/or Tensile Stress. The systems illustrated in FIG. 2 or 3 can be used to model the ratio of $ToF_{shear}$ and $ToF_{longitudinal}$ in bolts as a function tension and/or as a function of tensile stress. In one embodiment, a plurality of bolts can be selected from among a set of bolts to be audited, such as 10% of the bolts. In some embodiments, each of the plurality of test bolts can be set to a one or more known tension values.

In some embodiments, transducer 210 can be an ultrasonic longitudinal wave transducer and detachably coupled to each of the plurality of test bolts. Pulser/receiver 220 and/or processing device 230, either of which can be operatively connected to transducer 210, can generate electrical pulses (e.g., voltages) that transducer 210 converts into ultrasonic longitudinal waves. The longitudinal waves will propagate through the test bolt and reflect back to transducer 210. The transducer 210, in turn, can receive the ultrasonic longitudinal waves and convert them into electrical signals, which can be transmitted to the pulser/receiver 220 and/or processing device 230. The $ToF_{longitudinal}$ can be recorded for each bolt at each tension level that is set in the bolt.

In some embodiments, transducer 210 can be an ultrasonic shear wave transducer and detachably coupled to each of the plurality of test bolts. Pulser/receiver 220 and/or processing device 230, each of which can be operatively connected to transducer 210, can generate electrical pulses (e.g., voltages) that transducer 210 converts into ultrasonic shear waves. The shear waves will propagate through the test bolt and reflect back to transducer 210. The transducer 210, in turn, can receive the ultrasonic shear waves and convert them into electrical signals, which can be transmitted to the pulser/receiver 220 and/or processing device 230. The $ToF_{shear}$ can be recorded for each bolt at each tension level that is set in the bolt.

Figure 12:
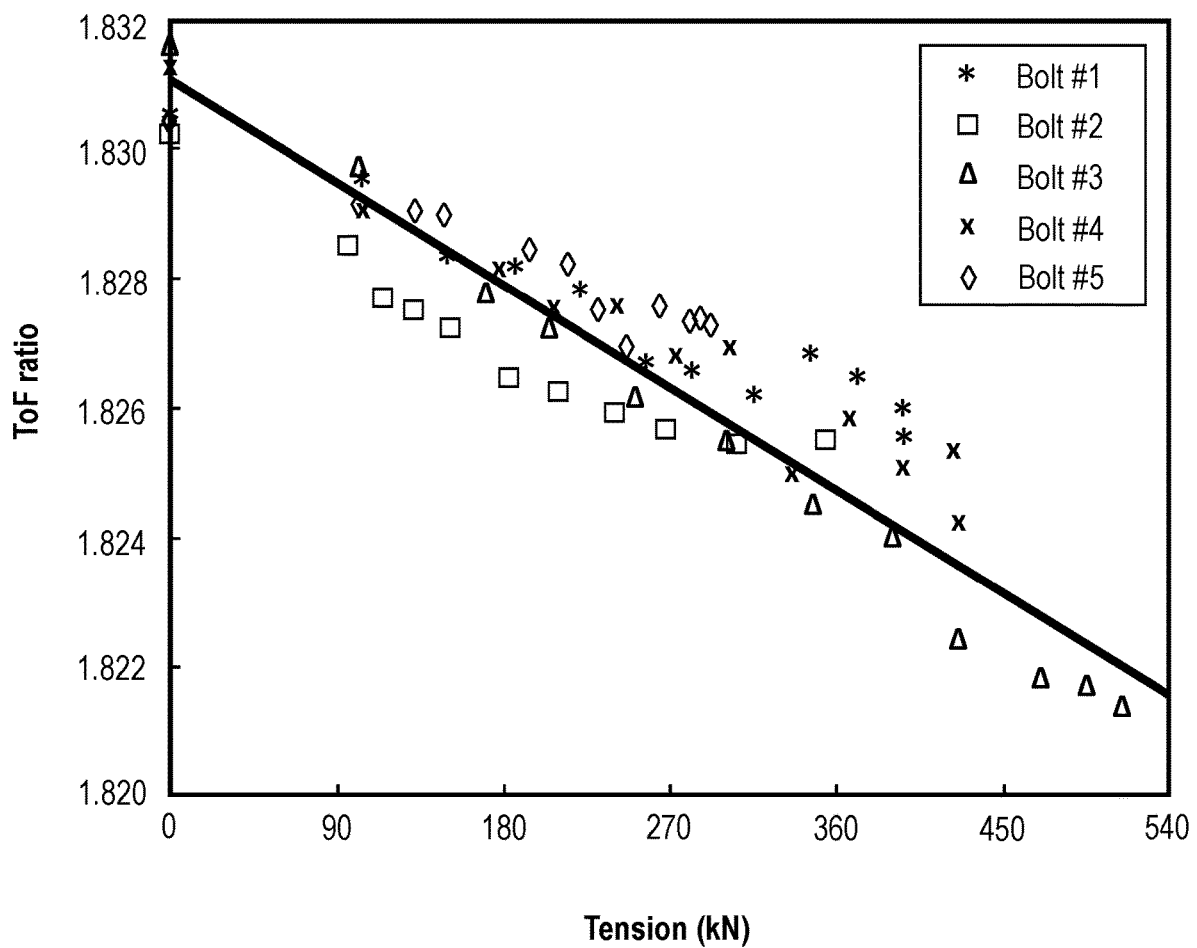
FIG. 12 is a graph diagram illustrating an example plot of tension expressed as a function of $ToF_{ratio}$.

In some embodiments, raw data collected may include $ToF_{longitudinal}$, $ToF_{shear}$, and tension values that correspond to each $ToF_{longitudinal}$ and $ToF_{shear}$, in addition to metadata about the bolt. This data can be used to generate a regression plot and/or a regression equation to model the $ToF_{ratio}$ as a function of tension. FIG. 12 is a graph diagram illustrating an example plot of tension expressed as a function of $ToF_{ratio}$, such as $ToF_{shear}/ToF_{longitudinal}$. As illustrated in FIG. 12, the $ToF_{ratio}$ can be correlated to the values of tension that were set in each test bolt, which, in this example, ranged from approximately 90 kN to 540 kN and included a zero tension value. The plot of FIG. 12 thus models tension as a function of the $ToF_{ratio}$ of shear and longitudinal waves in the set of test bolts.

Figure 13:
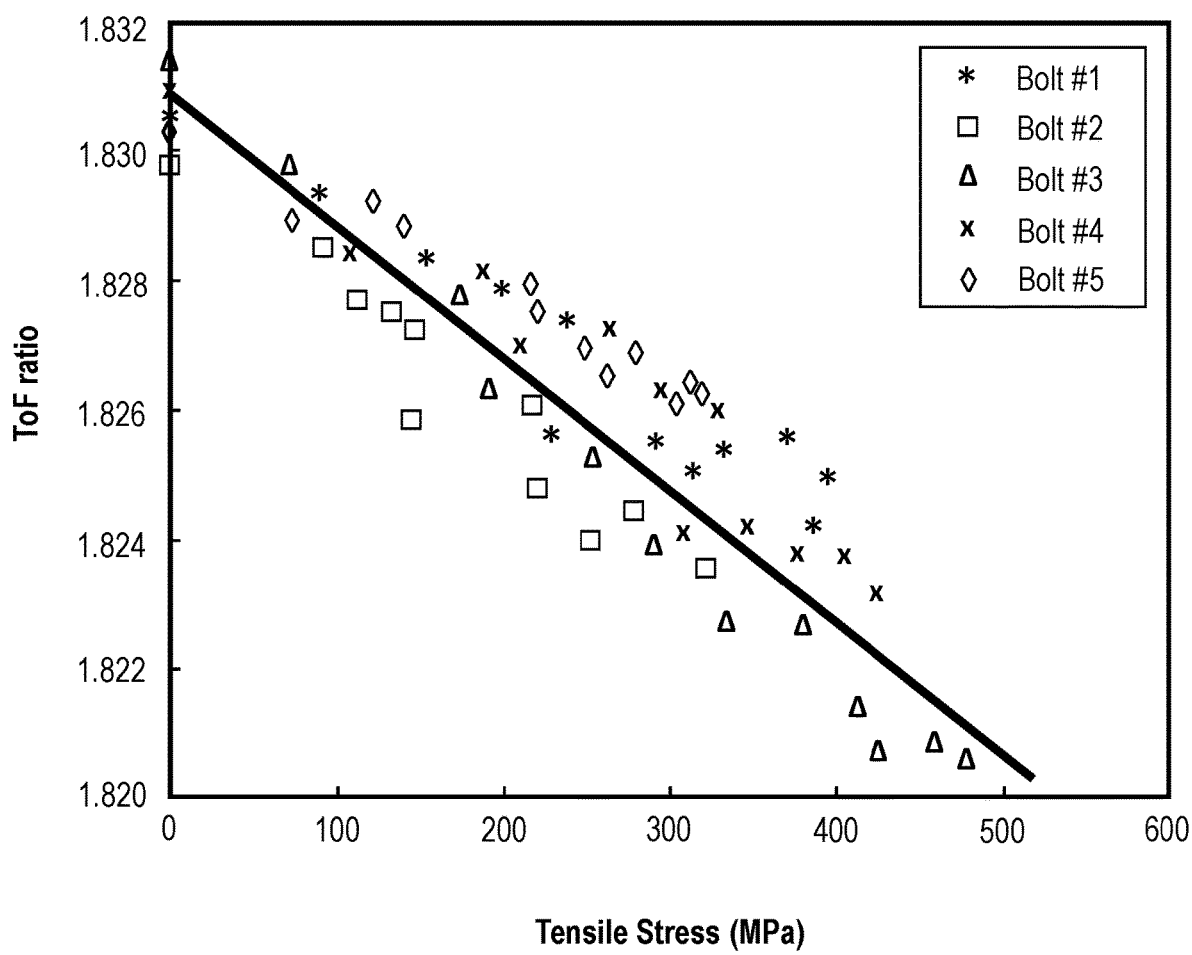
FIG. 13 is a graph diagram illustrating an example plot of tensile stress expressed as a function of $ToF_{ratio}$.

In some embodiments, data collected may include $ToF_{longitudinal}$, $ToF_{shear}$, tension values that correspond to each $ToF_{longitudinal}$ and $ToF_{shear}$, and nominal cross-sectional areas of the bolts for which $ToF_{longitudinal}$ and $ToF_{shear}$ were measured, in addition to metadata about the bolt. This data can be used to generate a regression plot and/or a regression equation to model the $ToF_{ratio}$ as a function of tensile stress. FIG. 13 is a graph diagram illustrating an example plot of tensile stress expressed as a function of $ToF_{ratio}$, such as $ToF_{shear}/ToF_{longitudinal}$. As illustrated in FIG. 13, the $ToF_{ratio}$ can be correlated to the tensile stress in each test bolt, which can be determined by setting each test bolt to known values of tension, then dividing the tension values by the nominal cross-sectional area of the bolts. The plot of FIG. 13 thus models tensile stress as a function of the $ToF_{ratio}$ of shear and longitudinal waves.

Figure 14:
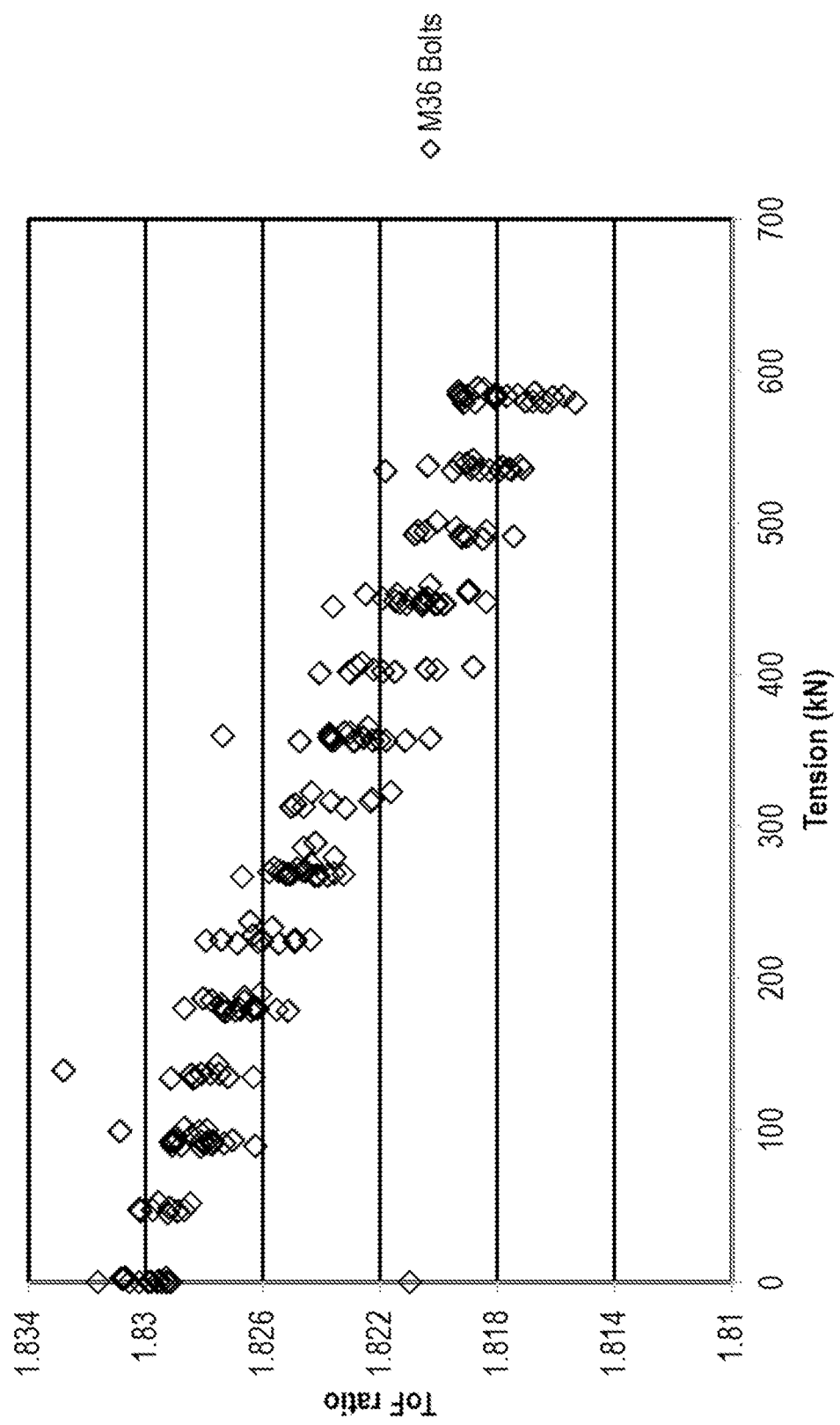
FIGS. 14-16 are graph diagrams illustrating example plots of tension expressed as a function of $ToF_{ratio}$ for different bolts.
Figure 15:
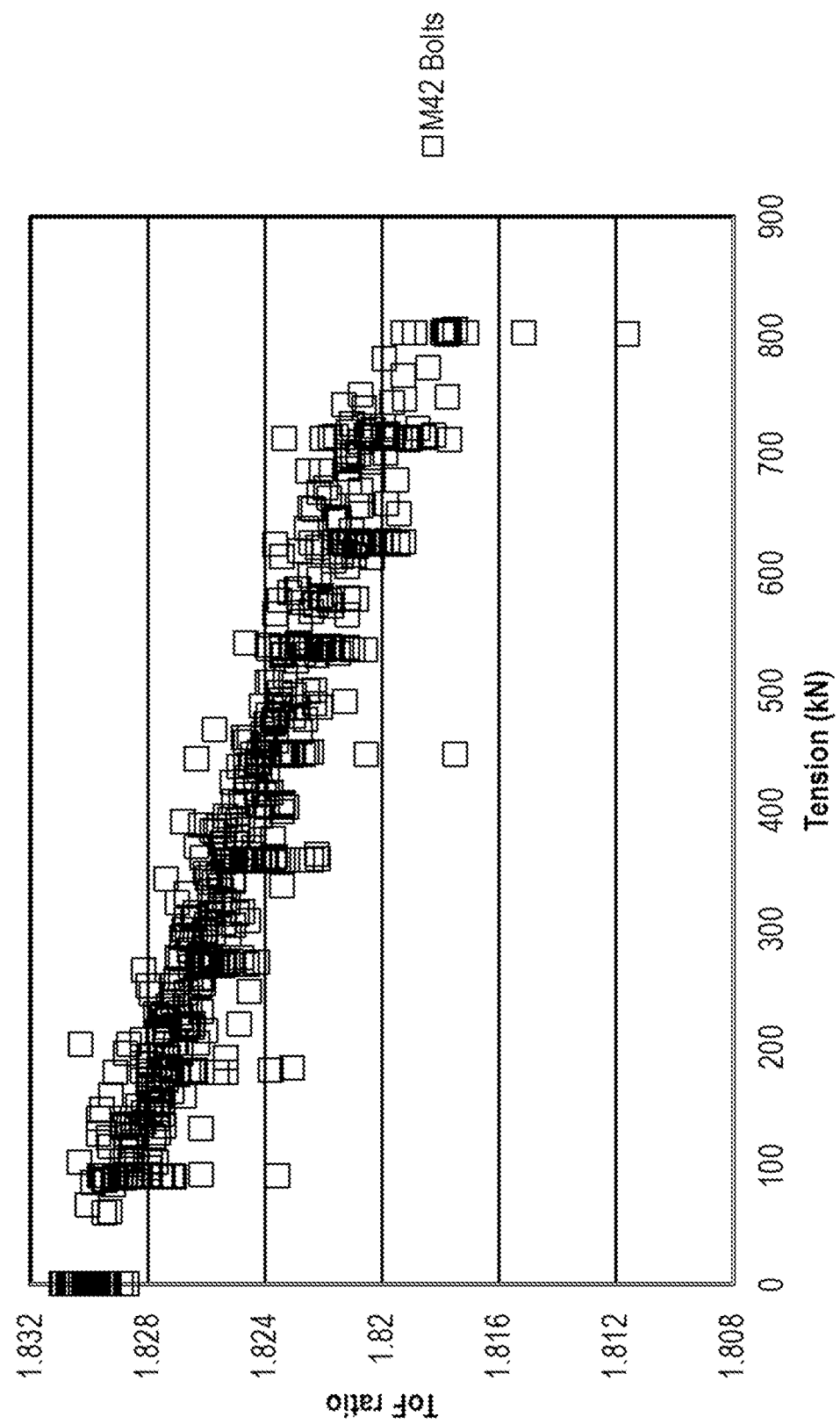
Figure 16:
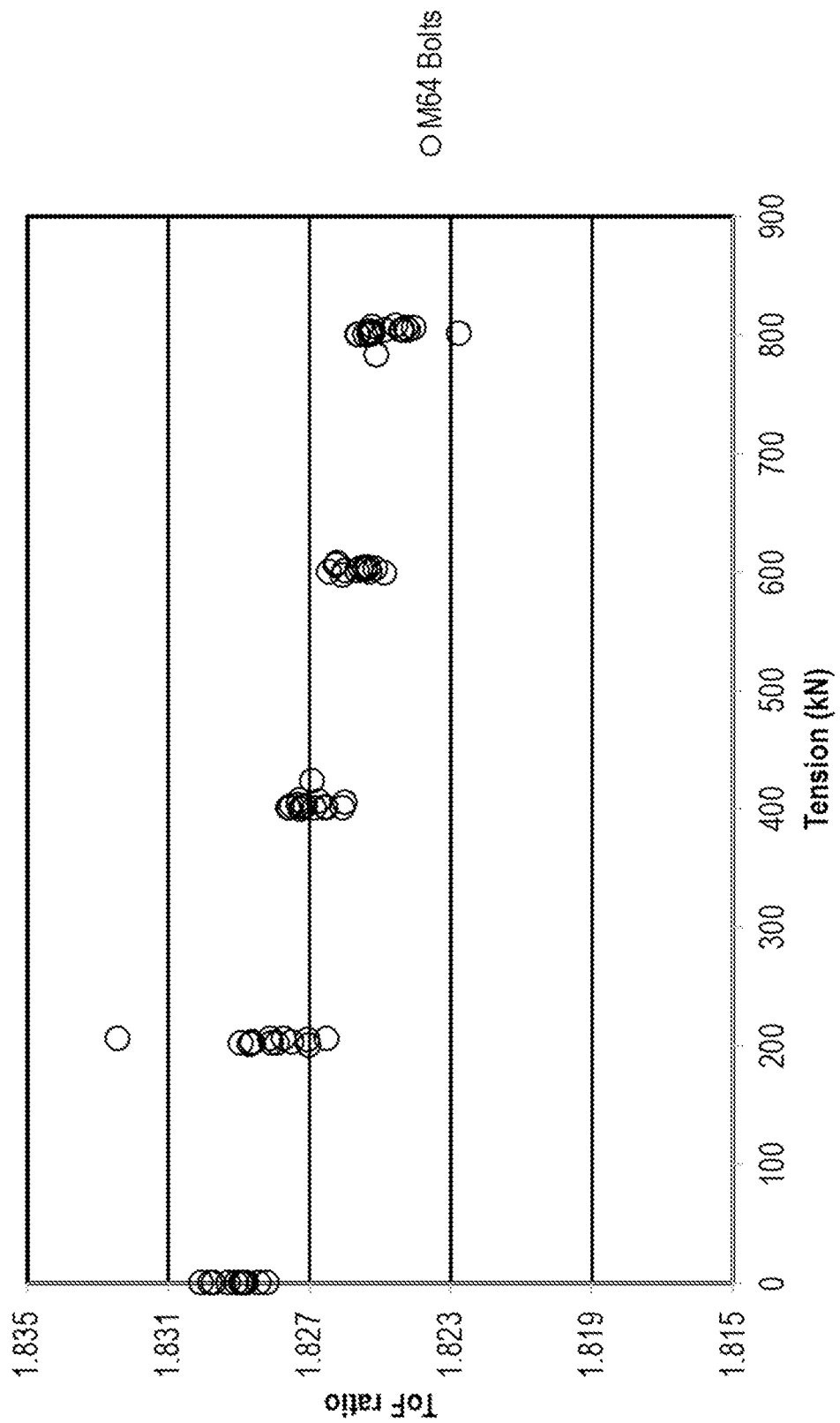
Figure 17:
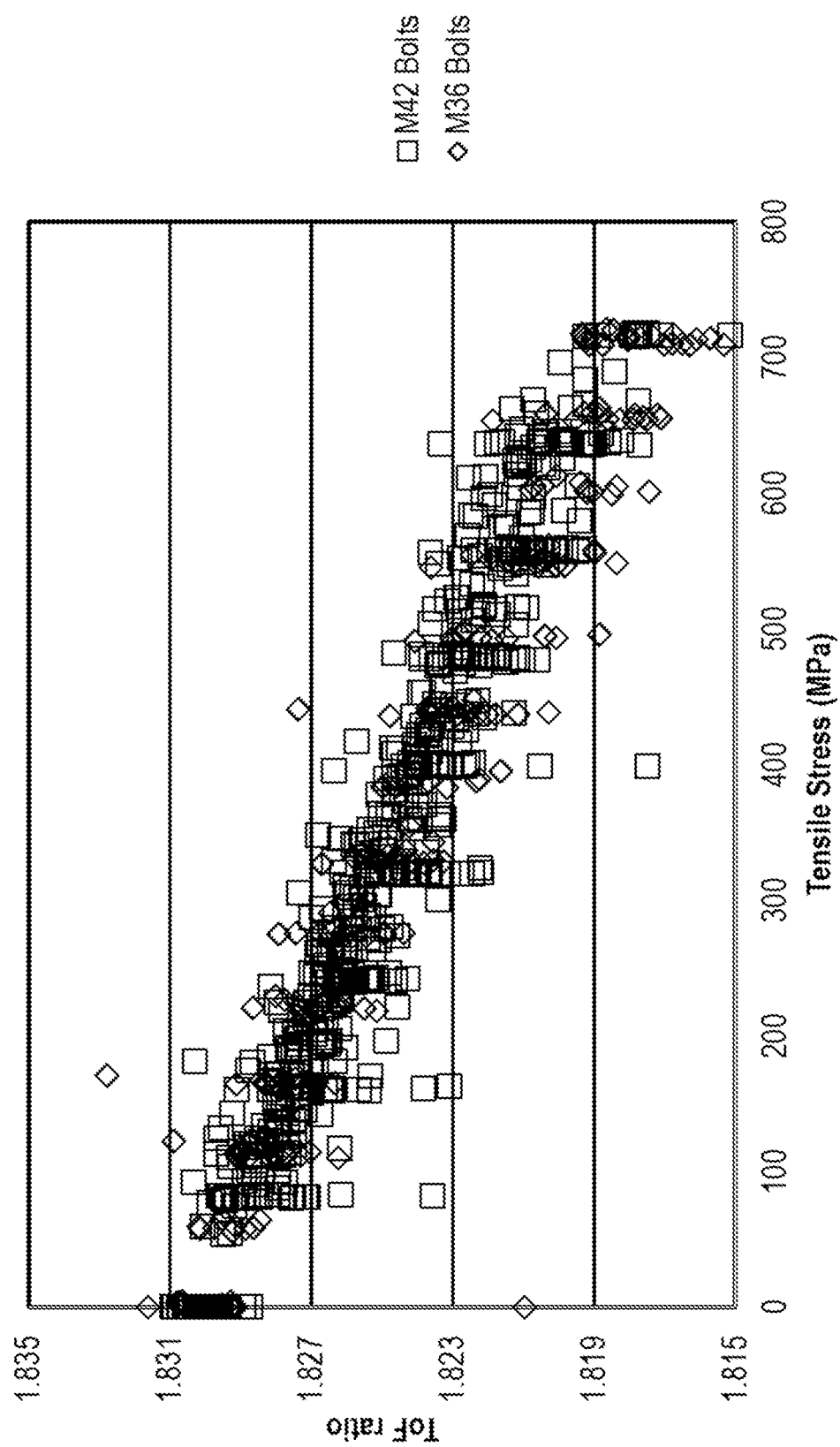
FIGS. 17-18 are graph diagrams illustrating example plots of tensile stress expressed as a function of $ToF_{ratio}$ for different bolts.
Figure 18:
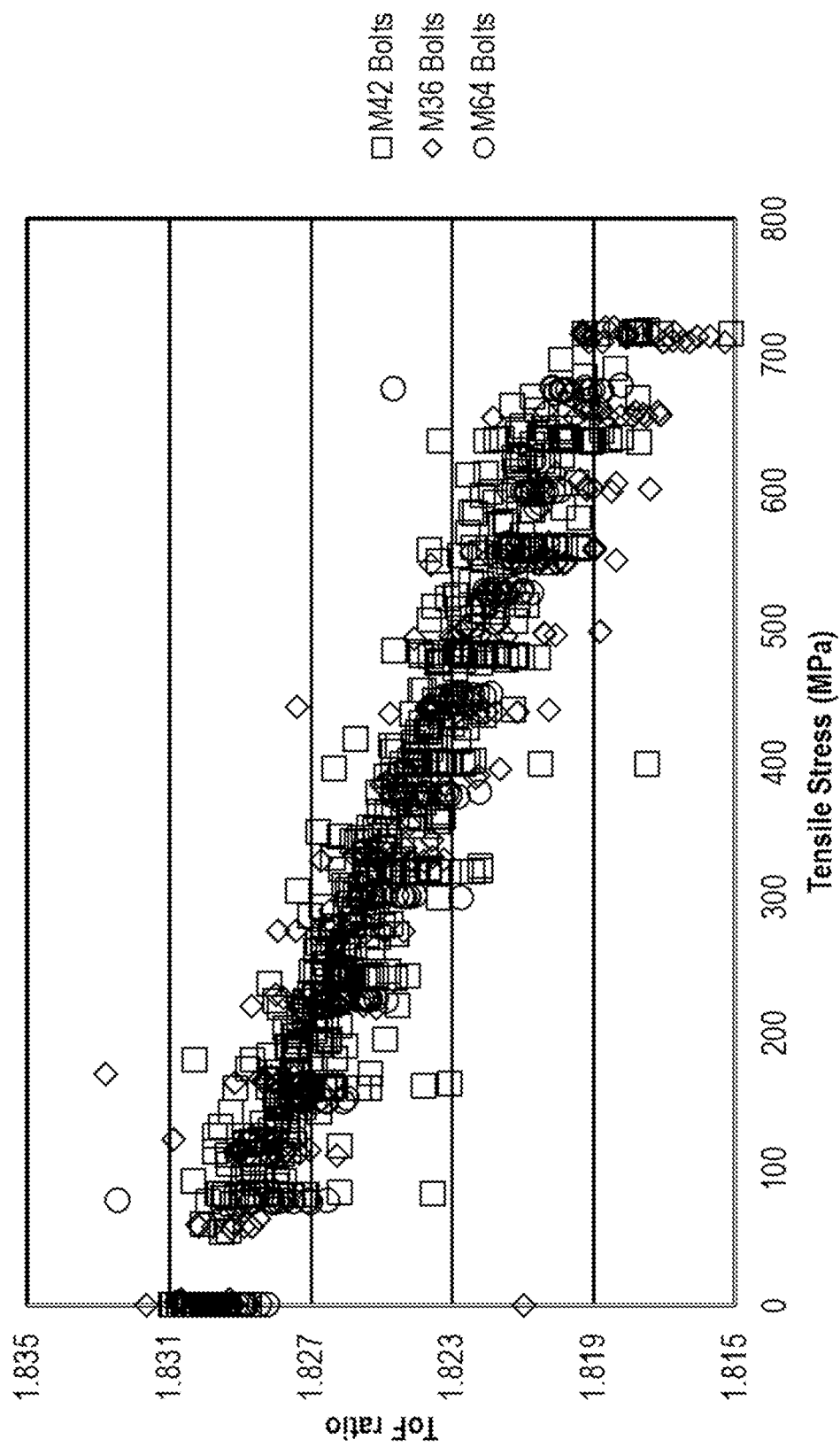

FIGS. 14-18 provide further examples of regression models. FIG. 14 is a graph diagram illustrating a plot of tension expressed as a function of $ToF_{ratio}$ for Grade 10.9 M36 bolts having lengths of 205 mm. FIG. 15 is a graph diagram illustrating a plot of tension expressed as a function of $ToF_{ratio}$ for Grade 10.9 M42 bolts ranging in lengths from 241 mm to 387 mm. FIG. 16 is a graph diagram illustrating a plot of tension expressed as a function of $ToF_{ratio}$ for Grade 10.9 M64 bolts having lengths of 415 mm. FIG. 17 is a graph diagram illustrating a plot of tensile stress expressed as a function of $ToF_{ratio}$ for the M36 and M42 bolts used to create the plots in FIGS. 14 and 15. FIG. 18 is a graph diagram illustrating a plot of tensile stress expressed as a function of $ToF_{ratio}$ for the M36, M42, and M64 bolts used to create the plots of FIGS. 14, 15, and 16.

The example models of FIGS. 12-18 are non-limiting examples. Regardless of whether tension or tensile stress is used to create a model, any number of test bolts may be used, each test bolt may be set to any number of tension values, any value of tension that the test bolt can withstand may be used, and the values of tension set in each test bolt need not be the same or uniform. Generally, however, the more data collected the better the model may be. For example, 1, 2, 3, 4, 5, 6, 7, 8, 9, 10, 15, 20 or more, less, or any intermediate number of test bolts can be selected. Each test bolt can be set to 1, 2, 3, 4, 5, 6, 7, 8, 9, 10, 15, 20 or more, less, or any intermediate number of different tension values. The amount of tension that is set in each test bolt can span a range of tension values. The tension values set in each bolt can be uniformly or non-uniformly spaced within a range. The tension applied to one test bolt need not be applied to any other test bolt. Thus, the number of test bolts selected, the number of different tension values applied to each bolt, the amount of tension applied to each bolt, and the manner in which each tension value is selected (e.g., uniformly spaced, randomly chosen, etc.) are not limitations of the invention. In some embodiments, at least five test bolts are used to create a model and each test bolt is set to at least nine different tension values. In other embodiments, where either tension or tensile stress is modeled using M36, M42, or M64 test bolts, the amount of tension set in each test bolt can range from 0 to about 1800 kN.

In some embodiments, a regression equation can be determined using $\text{ToF}_{longitudinal}$, $\text{ToF}_{shear}$, and the tension values that correspond to each $\text{ToF}_{longitudinal}$ and $\text{ToF}_{shear}$. For example, a software program such as MATLAB® may be utilized to perform regression analysis on the collected data, such as linear regression. The software may identify the equation of a line having the form of either equation (3) or equation (5) in which the distance between each collected data point and the line is minimized. From the regression equation, the constants C and D from equation (3) or A and B from equation (5) may be determined, as applicable. The regression equation can then be used determine residual tension in bolts that were not part of creating the model (e.g., using equation (4) or (6)).

In some embodiments, a machine learning algorithm can be used to construct a model that expresses the $\text{ToF}_{ratio}$ as a function of tension or tensile stress. For example, the machine learning algorithm can receive a set of training data, where the training data includes the average $\text{ToF}_{longitudinal}$ collected from one or more test events, the average $\text{ToF}_{shear}$ collected from one or more test events, the ratio of each of the ToF averages, and bolt meta data, such as bolt size, bolt length, and clamp length. As explained above, a GUI executing on processing device 230 can be used to collect meta data from the user about each bolt used for the training data, while the methods of FIGS. 6, 10, and/or 11 can be used to obtain $\text{ToF}_{longitudinal}$, $\text{ToF}_{shear}$, and $\text{ToF}_{ratio}$. Other data can also be used as input to the machine learning algorithm, including but not limited to, amplitudes and timestamps for overall peaks and valleys for longitudinal waves and for shear waves, individual $\text{ToF}_{longitudinal}$ measurements and individual $\text{ToF}_{shear}$ measurements (e.g., step 626 of FIG. 6), noise measurements in the longitudinal and shear waves, resonance frequencies and resonance frequency shifts in longitudinal and shear waves, phase of longitudinal and shear waves, and the like.

Multiple regression models can be evaluated to determine which produces the most accurate model. For example, and without limitation, Linear Regression (LN), K-Nearest Neighbor (KNN), Random Forest (RF), XGBoost, Multi-layer Perceptron (MLP), and other regression models can be evaluated with certain criteria, such as using 5-fold cross validation MAE (Mean Absolute Error). Each evaluation can result in a score and the best performing model can be selected, such as the model that results in having the lowest 5-fold MAE.

Once a regression model is selected, the hyperparameters (i.e., parameters used to control the learning process) can be tuned for optimal performance, e.g., using Root Mean Squared Error (RMSE). For example, the optimal hyperparameters can be determined by evaluating the model performance on future (unseen) data. One example is to use K-fold cross validation (CV) in which the training data is divided into K folds randomly such that the training of the model is performed on the (K−1) folds using the specified hyperparameters, and then the remaining single fold is used for validation. That is, each round of validation can be considered as the evaluation of the model generalization capability on unseen data. After repeating this process K times, the average value of performance measures from the K rounds can be taken as the overall measure to evaluate the model's performance with the corresponding hyperparameters. The size of K can be any value such as 1, 2, 3, 4, 5, 6, 7, 8, 9, 10, etc. The tuned regression model can then be reevaluated using 5-fold MAE. Additionally, the error distribution can be reported, for example, with minimum, 50%, 90%, 95%, and maximum error, to help assess the accuracy of the regression model chosen.

The tuned regression model with the related hyperparameters can be packaged for deployment and integrated into a software solution. For example, in some embodiments, the tuned regression model can be deployed on processing device 230 and used to determine residual tension in bolts (e.g., bolts not used for the training data) as explained below. The determination can be made in real-time or at a later time. In some embodiments, the regression model can also reside on a server or a remote computer and used for off-site analysis.

Figure 19:
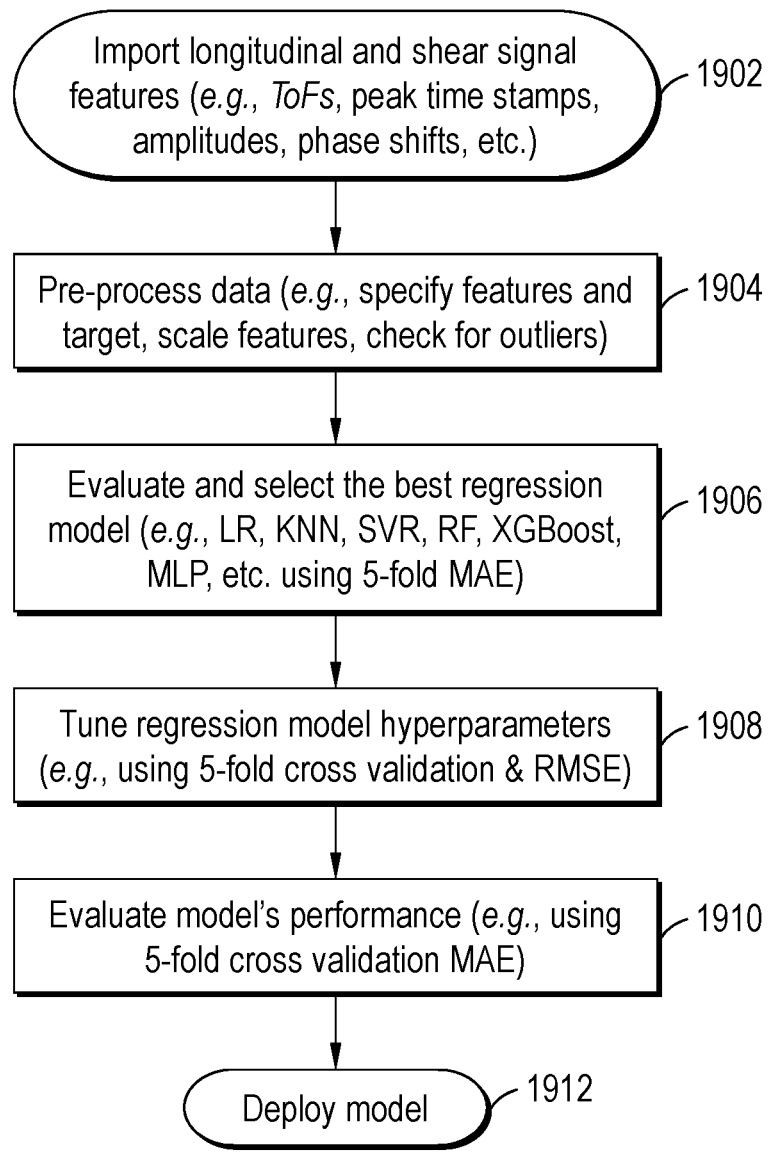
FIG. 19 is a flow diagram illustrating an example method for building a regression model.

In view of the above, a method for using a machine learning algorithm to create a model that expresses the $\text{ToF}_{ratios}$ of a plurality of test bolts (i.e., training data) as a function of tension or tensile stress is provided in FIG. 19.

Determining Residual Tension. Once a model is created that expresses tension or tensile stress as a function of the $\text{ToF}_{ratio}$, the amount of residual tension in a bolt can be determined merely by measuring the $\text{ToF}_{ratio}$ in the bolt. For example, a bolt (that is not one of the test bolts and for which the value of residual tension is unknown) can be selected. The $\text{ToF}_{longitudinal}$ and $\text{ToF}_{shear}$ can be determined for the bolt from which the $\text{ToF}_{ratio}$ can be determined. The amount of residual tension of the bolt can then be determined using a machine learning algorithm as explained above, using plots such as those illustrated in FIGS. 12-18, or by using an equation, such as equation (4) after the constants C and D have been determined from the model or equation (6) after the constants A and B have been determined from the model. Thus, the residual tension of any bolt can be determined merely by measuring the $\text{ToF}_{ratio}$ in the bolt and using the regression model and/or regression equation.

Figure 20:
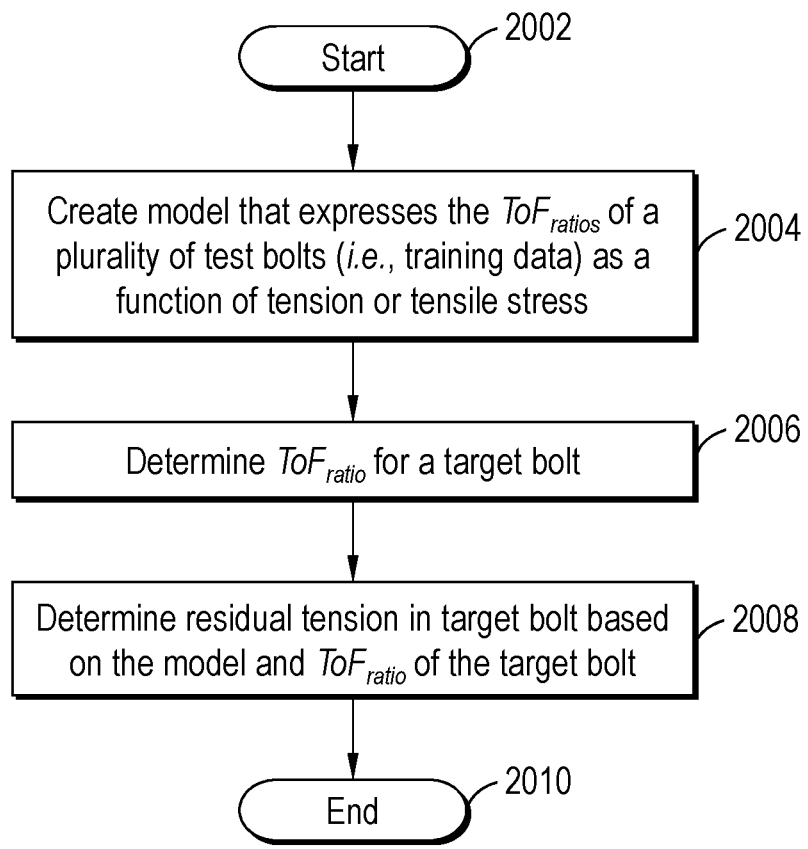
FIG. 20 is a flow diagram illustrating an example method for determining residual tension in a target bolt.

For example, FIG. 20 is a flow diagram illustrating an example method for determining the residual tension of a bolt. The method of FIG. 20 can be implemented with the systems illustrated in FIG. 2 or 3, but is not so limited. In other examples, additional or alternative systems and components can be used to perform the method of FIG. 20.

Upon starting at step 2002, a model can be created that expresses the $\text{ToF}_{ratios}$ of a plurality of test bolts (i.e., training data) as a function of tension or tensile stress. For example, the methods of FIGS. 6, 10, and/or 11 can be used to obtain ToF$_{ratios}$ for a plurality of test bolts, while the method of FIG. 19 can be used to create a model with a machine learning algorithm. Other methods can be used to perform step 2004 as will be discussed below. At step 2006, the ToF$_{ratio}$ for a target bolt can be determined, e.g., using the methods of FIGS. 6, 10 and/or 11. The term "target bolt" is used herein to refer to a bolt for which the residual tension is to be determined (typically, a bolt other than a bolt used as part of the training data to create a model). At step 2008, the residual tension of the target bolt can be determined based on the model created at step 2004 and the ToF$_{ratio}$ measured at step 2006. The method ends at step 2008.

Figure 21:
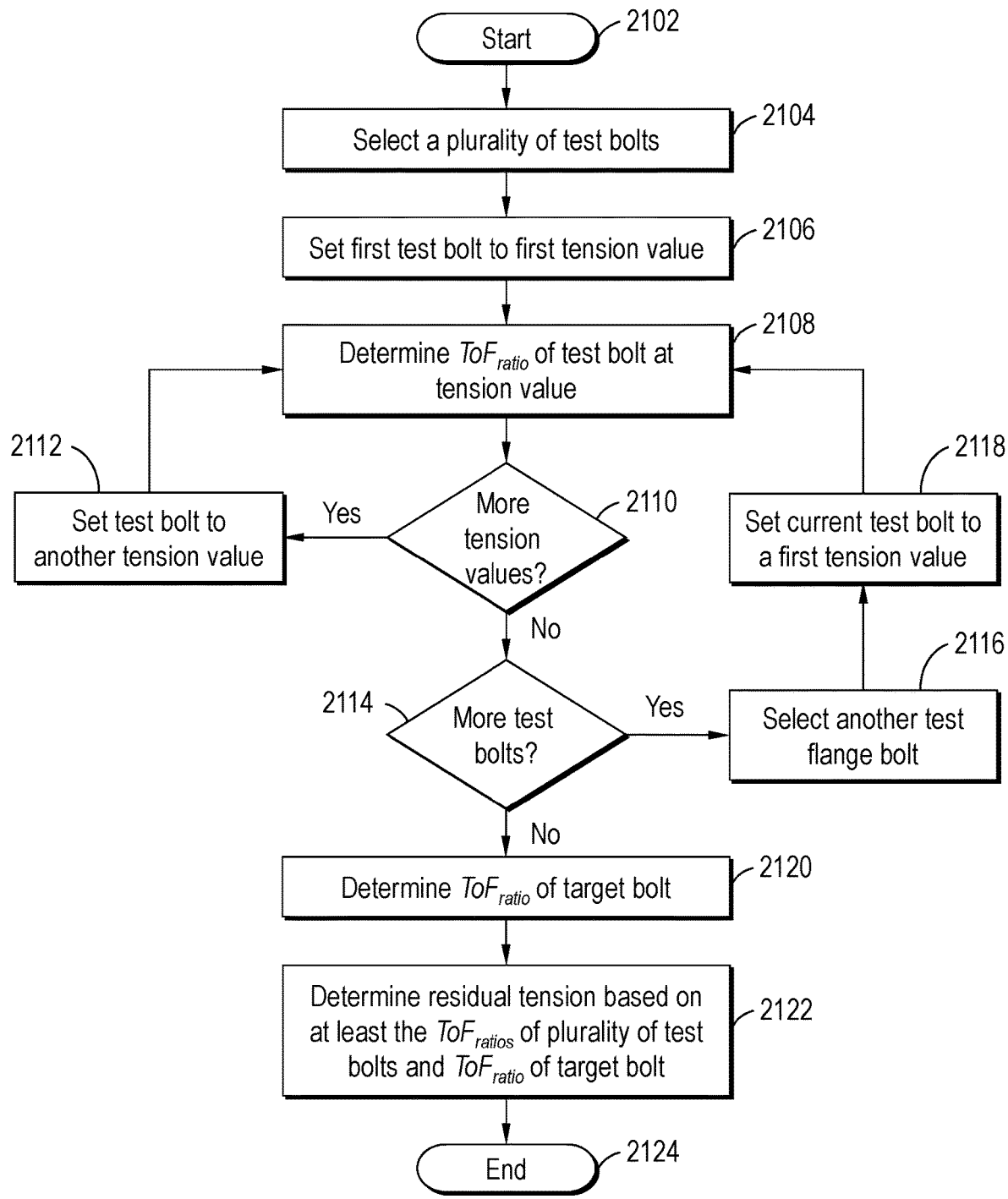
FIG. 21 is a flow diagram illustrating an example method for determining residual tension in a target bolt.

FIG. 21 is a flow diagram illustrating an example method for determining the residual tension of a bolt. The method of FIG. 21 can be implemented with the systems illustrated in FIG. 2 or 3, but is not so limited. In other examples, additional or alternative systems or components can be used to perform the method of FIG. 21. Moreover, the methods of FIGS. 6, 10, 11, and/or 19 can be used in connection with the method of FIG. 21.

Upon starting at step 2102, a plurality of test bolts can be selected at step 2104. As explained above, any number of test bolts can be selected to create a model. In some embodiments, at least 5 test bolts are selected. At step 2106, the first test bolt from the plurality can be set to a first known tension value. Any tension value that the test bolt can withstand can be used. The tension can be set using, for example, a hydraulic jack, a tensioner, a torque wrench, and the like. At step 2108, the ratio of ToF$_{shear}$ and ToF$_{longitudinal}$ can be determined for the currently-selected test bolt at the currently-set tension value. At step 2110, it can be determined whether additional tension values should be set in the currently-selected test bolt. As explained above, any number of tension values can be set in each test bolt. In some embodiments, at least nine tension values are set in increments of 45 kN. If additional tension values should be set in the currently-selected test bolt, the method can proceed to step 2112 and the currently-selected test bolt can be set to another tension value. Steps 2108 through 2112 can be repeated.

If no additional tension values should be set in the currently-selected test bolt at step 2110, it can be determined at step 2114 whether there are additional test bolts in the plurality to be tested. If there are additional test bolts to be tested, the method can proceed to step 2116 and another test bolt can be selected. At step 2118, the new currently-selected test bolt can be set to a first tension value. The method can proceed to steps 2108 through 2114. When, at step 2114, there are no additional test bolts in the plurality to be tested, the method can proceed to step 2120. At step 2120, the ToF$_{ratio}$ of a target bolt can be determined. At step 2122, the residual tension of the target bolt can be determined based on at least the ToF$_{ratios}$ of the plurality of test bolts and the ToF$_{ratio}$ of the target bolt. The method ends at step 2124.

Figure 22:
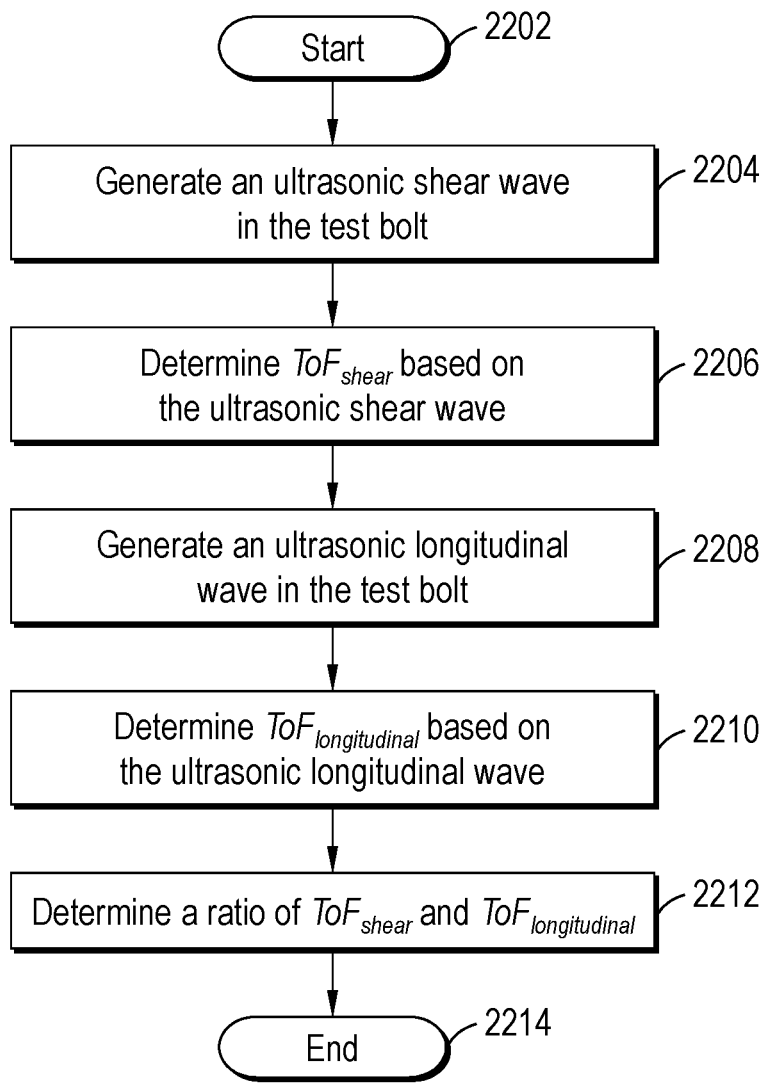
FIG. 22 is a flow diagram illustrating an example method for determining the ratio of $\text{ToF}_{shear}$ and $\text{ToF}_{longitudinal}$.

FIG. 22 is a flow diagram illustrating an example method for determining the ratio of ToF$_{shear}$ and ToF$_{longitudinal}$ for each tension value of each test bolt. The method can be used, for example, in connection with step 2108 of the method of FIG. 21. The method of FIG. 22 can be implemented with the systems illustrated in FIG. 2 or 3, but is not so limited. In other examples, additional or alternative systems or components can be used to perform the method of FIG. 22. Moreover, the methods of FIGS. 6, 10, and/or 11 can be used in connection with the method of FIG. 22.

Upon starting at step 2202, an ultrasonic shear wave can be generated in the test bolt at step 2204. At step 2206, ToF$_{shear}$ in the test bolt can be determined based on the ultrasonic shear wave. At step 2208, an ultrasonic longitudinal wave can be generated in the test bolt. At step 2210, ToF$_{longitudinal}$ in the test bolt can be determined based on the ultrasonic longitudinal wave. At step 2212, a ratio of ToF$_{shear}$ and ToF$_{longitudinal}$ can be determined. The method ends at step 2214.

Figure 23:
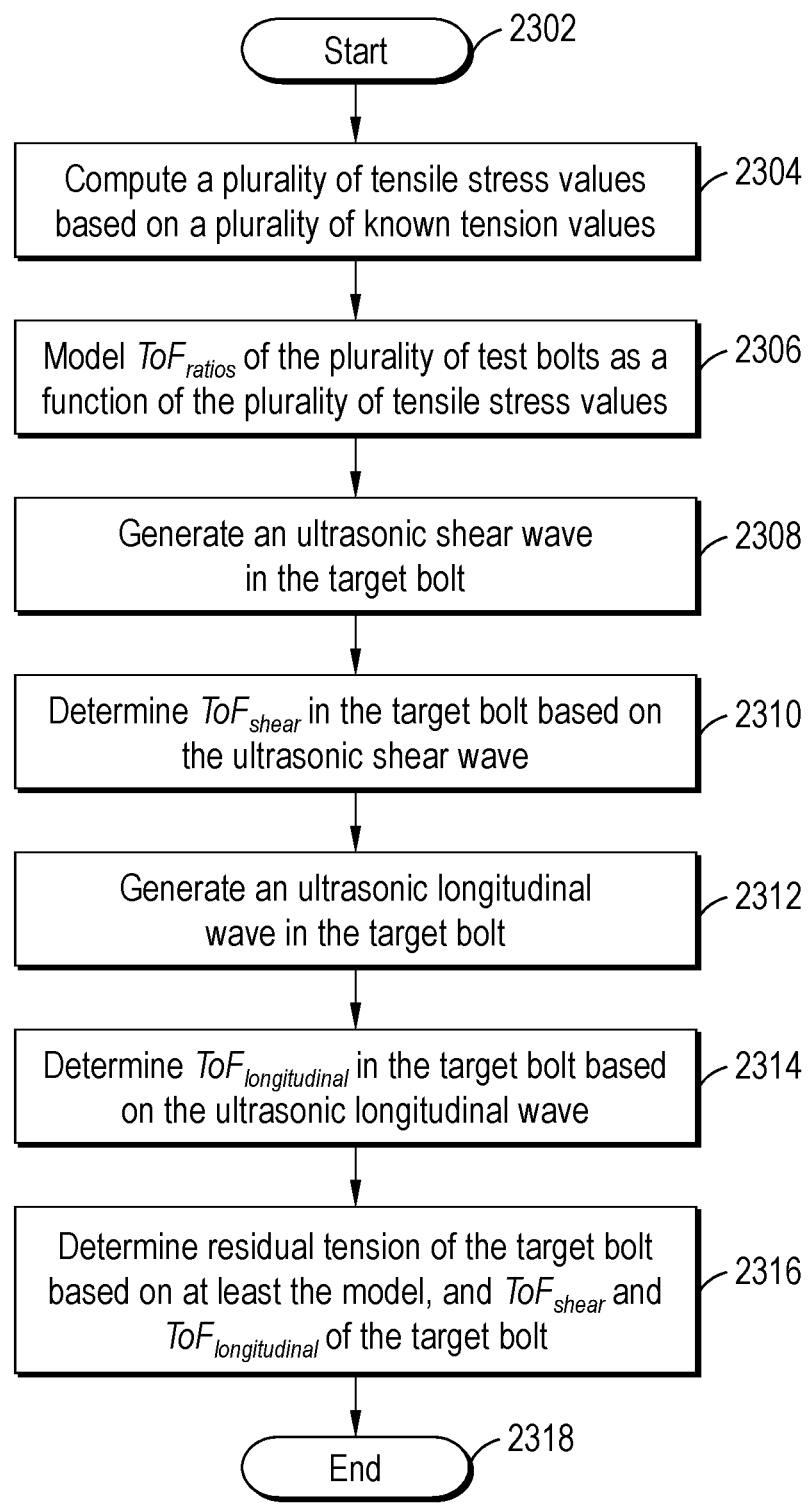
FIG. 23 is a flow diagram illustrating an example method for determining residual tension of a target bolt.

FIG. 23 is a flow diagram illustrating an example method for determining the residual tension of a target bolt. The method can be used, for example, in connection with steps 2120 and 2122 of the method of FIG. 21. The method of FIG. 23 can be implemented with the systems illustrated in FIG. 2 or 3, but is not so limited. In other examples, additional or alternative systems or components can be used to perform the method of FIG. 23. Moreover, the methods of FIGS. 6, 10, and/or 11 can be used in connection with the method of FIG. 23.

Upon starting at step 2302, a plurality of tensile stress values can be computed based on a plurality of known tension values at step 2304. At step 2306, a model can be created that expresses the ToF$_{ratios}$ of a plurality of test bolts as a function of the plurality of tensile stress values. For example, regression analysis can be used to create a regression plot and/or a regression equation for the model. In some embodiments, equation (3) can be utilized for the model. At step 2308, an ultrasonic shear wave can be generated in the target bolt. At step 2310, ToF$_{shear}$ in the target bolt can be determined based on the ultrasonic shear wave. At step 2312, an ultrasonic longitudinal wave can be generated in the target bolt. At step 2314, ToF$_{longitudinal}$ in the target bolt can be determined based on the ultrasonic longitudinal wave. At step 2316, the residual tension of the target bolt can be determined based on at least the model, and ToF$_{shear}$ and ToF$_{longitudinal}$ in the target bolt. For example, a regression plot corresponding to the model can be used to determine residual tension. As another example, equation (4) can be used to determine the residual tension of the target bolt. The method ends at step 2318.

Figure 24:
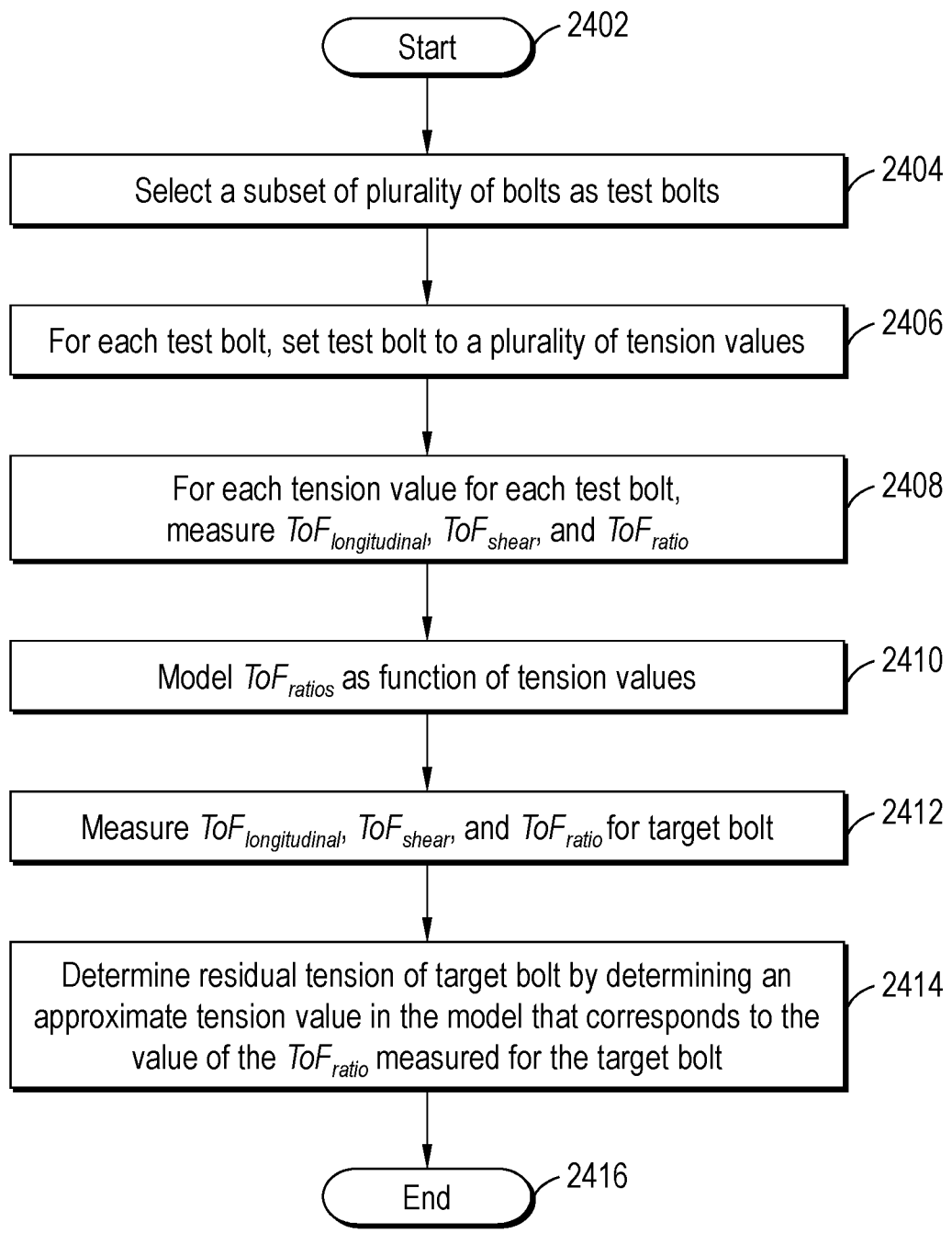
FIG. 24 is a flow diagram illustrating an example method for determining residual tension of a target bolt.

FIG. 24 is a flow diagram illustrating an example method for determining the residual tension of a target bolt disposed on a wind turbine tower. The tower can comprise a plurality of bolts joining structural members together. The method can be implemented with the systems illustrated in FIG. 2 or 3, but is not so limited. In other examples, additional or alternative systems or components can be used to perform the method of FIG. 24. Moreover, the methods of FIGS. 6, 10, 11, and/or 19 can be used in connection with the method of FIG. 24.

Upon starting at step 2402, a subset of the plurality of bolts joining the structural members together can be selected as test bolts (step 2404). As explained above, any number of bolts can be selected as the test bolts, including 1, 2, 3, 4, 5, 6, 7, 8, 9, 10, 15, 20, and so on. At step 2406, each test bolt can be set to a plurality of tension values. As explained above, any number of tension values can be set in each test bolt, including 1, 2, 3, 4, 5, 6, 7, 8, 9, 10, 15, 20, and so on. At step 2408, the time-of-flight of longitudinal waves, the time-of-flight of shear waves, and the ratio thereof can be measured for each tension value and for each test bolt. For example, suppose 10 test bolts are selected and each test bolt is set to 5 tension values. The result of performing step 2408 should include at least 50 ToF$_{longitudinal}$, 50 ToF$_{shear}$, and 50 ToF$_{ratios}$. Moreover, the methods of FIGS. 6, 10, and 11 can be used to determine ToF$_{longitudinal}$, ToF$_{shear}$, and/or ToF$_{ratio}$.

At step 2410, a model can be created that expresses tension as a function of $\text{ToF}_{ratios}$. For example, the method of FIG. 19 can be used to create a model with a machine learning algorithm. Additionally or alternatively, equation (3) can be used to create a model. Additionally or alternatively, a software program, such as MATLAB® can be used to create the model. The model can be based on regression analysis as well as other mathematical analysis techniques.

At step 2410, the $\text{ToF}_{longitudinal}$, $\text{ToF}_{shear}$, and $\text{ToF}_{ratio}$ for the target bolt can be measured. Moreover, the methods of FIGS. 6, 10, and 11 can be used to perform this step. At step 2414, the residual tension in the target bolt can be determined by determining an approximate tension value in the model that corresponds to the value of the $\text{ToF}_{ratio}$ measured for the target bolt. Moreover, the method of FIG. 19 can be used to perform this step. For example, a machine learning algorithm can be used to create a model in step 2410, receive $\text{ToF}_{ratio}$ for the target bolt, then provide a measurement for tension that corresponds to that $\text{ToF}_{ratio}$ according to the model at step 2414. The method ends at step 2416.

Additionally, the values of tension set in each bolt can be converted to tensile stress values by dividing the tension values by the nominal cross-sectional area of the test bolts. In this way, the $\text{ToF}_{ratios}$ for the test bolts can be expressed as a function of tensile stress. Further, residual tension can be determined in the target bolt by measuring tensile stress in the target bolt corresponding to $\text{ToF}_{longitudinal}$, $\text{ToF}_{shear}$, and $\text{ToF}_{ratio}$. In this way, residual tension can be determined by determining the approximate tensile stress value that corresponds to the $\text{ToF}_{ratio}$ measured for the target bolt, then multiplying the tensile stress by the nominal cross-sectional area of the bolt.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law. Further, the sequence of steps for the example methods described or illustrated herein are not to be construed as necessarily requiring their performance in the particular order described or illustrated unless specifically identified as requiring so or clearly identified through context. Moreover, the example methods may omit one or more steps described or illustrated, or may include additional steps in addition to those described or illustrated. Thus, one of ordinary skill in the art, using the disclosures provided herein, will appreciate that various steps of the example methods can be omitted, rearranged, combined, and/or adapted in various ways without departing from the spirit and scope of the inventions.

What is claimed is:

1. A method of determining residual tension in a target bolt, the method comprising:
   modeling ratios of times-of-flight of longitudinal waves and times-of-flight of shear waves as a function of tension for a plurality of test bolts;
   determining a ratio of a time-of-flight of longitudinal waves and a time-of-flight of shear waves in a target bolt; and
   determining residual tension in the target bolt based on the model and the ratio of a time-of-flight of longitudinal waves and time-of-flight of shear waves in the target bolt.

2. The method of claim 1, wherein modeling ratios of times-of-flight of longitudinal waves and times-of-flight of shear waves as a function of tension for a plurality of test bolts comprises:
   determining, for each test bolt in the plurality of test bolts:
      one or more times-of-flight of ultrasonic (UT) longitudinal waves in the test bolt corresponding to one or more levels of tension;
      one or more times-of-flight of UT shear waves in the test bolt corresponding to the one or more levels of tension; and
      ratios of the one or more times-of-flight of UT longitudinal waves and the one or more times-of-flight of UT shear waves at each of the one or more levels of tension.

3. The method of claim 2, wherein determining the one or more times-of-flight of UT longitudinal waves in the test bolt corresponding to one or more levels of tension comprises:
   for each of the one or more levels of tension:
      receiving, from a transducer, raw data relating to reflections of UT longitudinal waves in the test bolt, wherein the raw data comprises at least a first echo and a second echo; and
      evaluating the raw data to determine that it satisfies a first set of criteria.

4. The method of claim 3, wherein at least one criterion of the first set of criteria is that the first echo arrives within an expected time range.

5. The method of claim 3, wherein at least one criterion of the first set of criteria is that a time separating an overall maximum peak and an overall minimum peak for the first echo, or a time separating an overall maximum peak and an overall minimum peak for the second echo, or both, are below a threshold.

6. The method of claim 3 further comprising evaluating the raw data by calculating one or more times-of-flight of longitudinal waves from the raw data and determining that the one or more times-of-flight meet a second set of criteria.

7. The method of claim 6, wherein at least one criterion of the second set of criteria is that the times-of-flight are within an expected range.

8. The method of claim 6, wherein at least one criterion of the second set of criteria is that each time-of-flight does not deviate from any other time-of-flight by an amount greater than a threshold.

9. The method of claim 2, wherein determining one or more times-of-flight of UT shear waves in the test bolt corresponding to one or more levels of tension comprises:
   for each of the one or more levels of tension:
      receiving, from a transducer, raw data relating to reflections of UT shear waves in the test bolt, wherein the raw data comprises at least a first echo and a second echo; and
      evaluating the raw data to determine that it satisfies a first set of criteria.

10. The method of claim 9, wherein at least one criterion of the first set of criteria is that the first echo arrives within an expected time range.

11. The method of claim 9, wherein at least one criterion of the first set of criteria is that a time separating an overall maximum peak and an overall minimum peak for the first, or a time separating an overall maximum peak and an overall minimum peak for the second echo, or both, are below a threshold.

12. The method of claim 9 further comprising evaluating the raw data by calculating one or more times-of-flight of shear waves from the raw data and determining that the one or more times-of-flight meet a second set of criteria.

13. The method of claim 12, wherein at least one criterion of the second set of criteria is that the times-of-flight are within an expected range.

14. The method of claim 12, wherein at least one criterion of the second set of criteria is that each time-of-flight does not deviate from any other time-of-flight by an amount greater than a threshold.

15. The method of claim 2, wherein determining, for each of the plurality of test bolts, ratios of the one or more times-of-flight of UT longitudinal waves and the one or more times-of-flight of UT shear waves comprises:
- analyzing the one or more times-of-flight of UT longitudinal waves to identify which times-of-flight are suitable for calculating a longitudinal wave time-of-flight, wherein the suitable times-of-flight are those times-of-flight that meet a third set of criteria;
- analyzing the one or more times-of-flight of UT shear waves to identify which times-of-flight are suitable for calculating a shear wave time-of-flight, wherein the suitable times-of-flight are those times-of-flight that meet the third set of criteria;
- determining that the number of suitable times-of-flight of UT longitudinal waves is above a threshold;
- determining that the number of suitable times-of-flight of UT shear waves is above a threshold;
- calculating an average longitudinal wave time-of-flight based on the suitable times-of-flight of UT longitudinal waves;
- calculating an average shear wave time-of-flight based on the suitable times-of-flight of UT shear waves; and
- calculating a ratio of the average longitudinal wave time-of-flight and the average shear wave time-of-flight.

16. The method of claim 15, wherein the third set of criteria for longitudinal waves comprises determining that a difference between the maximum time-of-flight of UT longitudinal waves and the minimum time-of-flight of UT longitudinal waves is below a threshold.

17. The method of claim 15, wherein the third set of criteria for longitudinal waves comprises dividing the one or more times-of-flight of UT longitudinal waves into two or more groups and determining which group contains the most times-of-flight.

18. The method of claim 15, wherein the third set of criteria for shear waves comprises determining that a difference between the maximum time-of-flight of UT shear waves and the minimum time-of-flight of UT shear waves is below a threshold.

19. The method of claim 15, wherein the third set of criteria for shear waves comprises dividing the one or more times-of-flight of UT shear waves into two or more groups and determining which group contains the most times-of-flight.

* * * * *